United States Patent
Abotabl et al.

(10) Patent No.: US 12,549,322 B2
(45) Date of Patent: Feb. 10, 2026

(54) JOINT DL/UL BANDWIDTH TECHNIQUES IN FULL-DUPLEX MODE

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Alexandros Manolakos, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 529 days.

(21) Appl. No.: 17/999,629

(22) PCT Filed: May 28, 2021

(86) PCT No.: PCT/US2021/034994
§ 371 (c)(1),
(2) Date: Nov. 22, 2022

(87) PCT Pub. No.: WO2021/243287
PCT Pub. Date: Dec. 2, 2021

(65) Prior Publication Data
US 2023/0239128 A1 Jul. 27, 2023

(30) Foreign Application Priority Data
May 29, 2020 (GR) ................ 20200100291

(51) Int. Cl.
*H04L 5/14* (2006.01)
*H04W 72/0453* (2023.01)

(52) U.S. Cl.
CPC ........... *H04L 5/14* (2013.01); *H04W 72/0453* (2013.01)

(58) Field of Classification Search
CPC ............................. H04L 5/14; H04W 72/0453
See application file for complete search history.

(56) References Cited

U.S. PATENT DOCUMENTS 5,025,452 A * 6/1991 Sohner ............... H04B 5/28
375/130
11,509,383 B2 * 11/2022 Xu .................. H04L 5/0051
(Continued)

FOREIGN PATENT DOCUMENTS

| WO | WO-2019097649 A1 | 5/2019 |
| WO | WO-2019225970 A1 | 11/2019 |

OTHER PUBLICATIONS

International Search Report and Written Opinion—PCT/US2021/034994—ISA/EPO—Sep. 20, 2021.

*Primary Examiner* — Won Tae C Kim
(74) *Attorney, Agent, or Firm* — NORTON ROSE FULBRIGHT US LLP

(57) ABSTRACT

In one aspect, a method of wireless communication includes receiving, by a wireless communication device during a slot, first data according to a first resource bandwidth (RBW) configuration of a bandwidth part (BWP) configuration, where the BWP configuration is configured for uplink and downlink operations. The method further includes transmitting, by the wireless communication device during the slot, second data according to a second RBW configuration of the BWP configuration, where the second RBW configuration is different from the first RBW configuration. Other aspects and features are also claimed and described.

18 Claims, 16 Drawing Sheets

(56) References Cited

U.S. PATENT DOCUMENTS

| | | |
|---|---|---|
| 2020/0119898 A1 | 4/2020 | Orsino et al. |
| 2020/0295913 A1 | 9/2020 | Takeda et al. |
| 2021/0126688 A1* | 4/2021 | Ji .................. H04L 25/0212 |
| 2021/0329646 A1* | 10/2021 | Fakoorian ............ H04W 72/53 |
| 2021/0392643 A1* | 12/2021 | Tiirola ................ H04L 5/0098 |
| 2022/0029761 A1* | 1/2022 | Su .................. H04L 27/2613 |
| 2022/0140966 A1* | 5/2022 | Choi ................ H04L 27/2613 |
| | | 370/329 |
| 2022/0182160 A1* | 6/2022 | Su .................. H04B 17/309 |

* cited by examiner

| μ | BWP switch delay $T_{BWPswitchDelay}$ (slots) | |
|---|---|---|
| | Type 1[Note 1] | Type 2[Note 1] |
| 0 | 1 | 3 |
| 1 | 2 | 5 |
| 2 | 3 | 9 |
| 3 | 6 | 18 |

NR Slot length (ms): 1, 0.5, 0.25, 0.125

Note 1: Depends on UE capability.
Note 2: If the BWP switch involves changing of SCS, the BWP switch delay is determined by the larger one between the SCS before BWP switch and the SCS after BWP switch.

360

370

JOINT DL/UL BANDWIDTH TECHNIQUES IN FULL-DUPLEX MODE

CROSS-REFERENCE TO RELATED APPLICATIONS

This application claims priority to International Patent Application No. PCT/US2021/034994, entitled, "JOINT DL/UL BWP IN FULL-DUPLEX MODE," filed on May 28, 2021 (204877WO) and also claims priority to Greece Patent Application Serial No. 20200100291, entitled, "JOINT DL/UL BWP IN FULL-DUPLEX MODE," filed on May 29, 2020, (204877GR1) the disclosure of which is hereby incorporated by reference herein in its entirety as if fully set forth below and for all applicable purposes.

TECHNICAL FIELD

Aspects of the present disclosure relate generally to wireless communication systems, and more particularly, to full-duplex wireless communications. Certain embodiments of the technology discussed below can enable and provide joint downlink and uplink bandwidth part operations for full-duplex wireless communication modes.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication includes: receiving, by a wireless communication device during a slot, first data according to a first resource bandwidth (RBW) configuration of a bandwidth part (BWP) configuration, wherein the BWP configuration is configured for uplink and downlink operations; and transmitting, by the wireless communication device during the slot, second data according to a second RBW configuration of the BWP configuration, the second RBW configuration different from the first RBW configuration.

In an additional aspect of the disclosure, an apparatus configured for wireless communication is disclosed. The apparatus includes at least one processor, and a memory coupled to the processor. The processor is configured to: receive, during a slot, first data according to a first resource bandwidth (RBW) configuration of a bandwidth part (BWP) configuration, wherein the BWP configuration is configured for uplink and downlink operations; and transmit, device during the slot, second data according to a second RBW configuration of the BWP configuration, the second RBW configuration different from the first RBW configuration.

In an additional aspect of the disclosure, a non-transitory, computer-readable medium stores instructions that, when executed by a processor, cause the processor to perform operations comprising: receiving, during a slot, first data according to a first resource bandwidth (RBW) configuration of a bandwidth part (BWP) configuration, wherein the BWP configuration is configured for uplink and downlink operations; and transmitting, during the slot, second data according to a second RBW configuration of the BWP configuration, the second RBW configuration different from the first RBW configuration.

In an additional aspect of the disclosure, an apparatus configured for wireless communication is disclosed. The apparatus includes: means for receiving, during a slot, first data according to a first resource bandwidth (RBW) configuration of a bandwidth part (BWP) configuration, wherein the BWP configuration is configured for uplink and downlink operations; and means for transmitting, during the slot, second data according to a second RBW configuration of the BWP configuration, the second RBW configuration different from the first RBW configuration.

In another aspect of the disclosure, a method of wireless communication includes: communicating, by a wireless communication device during a first slot, according to a first resource bandwidth (RBW) configuration of a bandwidth part (BWP) configuration; changing, by the wireless communication device, from the first RBW configuration to a second RBW configuration based on a BWP switching trigger and RBW configuration information; and communicating, by the wireless communication device during a second slot, according to the second RBW configuration, the second RBW configuration different from the first RBW configuration.

In another aspect of the disclosure, a method of wireless communication includes operating, by a user equipment (UE), according to a first bandwidth part (BWP) configuration for a first slot, the first BWP configuration having a first resource bandwidth (RBW) configuration; determining, by the UE, a BWP switching trigger and a RBW configuration; determining, by the UE, a second RBW configuration for the first BWP configuration for a second slot based on the BWP switching trigger and the RBW configuration, the second RBW configuration different from the first RBW configuration; and operating, by the UE, according to the second RBW configuration during the second slot.

In an additional aspect of the disclosure, an apparatus configured for wireless communication is disclosed. The apparatus includes means for operating, by a user equipment (UE), according to a first BWP configuration for a first slot, the first BWP configuration having a first RBW configuration; means for determining, by the UE, a BWP switching trigger and a RBW configuration; means for determining, by the UE, a second RBW configuration for the first BWP configuration for a second slot based on the BWP switching trigger and the RBW configuration, the second RBW configuration different from the first RBW configuration; and means for operating, by the UE, according to the second RBW configuration during the second slot.

In an additional aspect of the disclosure, a non-transitory computer-readable medium having program code recorded thereon. The program code further includes code to operate, by a user equipment (UE), according to a first BWP configuration for a first slot, the first BWP configuration having a first RBW configuration; determine, by the UE, a BWP switching trigger and a RBW configuration; determine, by the UE, a second RBW configuration for the first BWP configuration for a second slot based on the BWP switching trigger and the RBW configuration, the second RBW configuration different from the first RBW configuration; and operate, by the UE, according to the second RBW configuration during the second slot.

In an additional aspect of the disclosure, an apparatus configured for wireless communication is disclosed. The apparatus includes at least one processor, and a memory coupled to the processor. The processor is configured to operate, by a user equipment (UE), according to a first BWP configuration for a first slot, the first BWP configuration having a first RBW configuration; determine, by the UE, a BWP switching trigger and a RBW configuration; determine, by the UE, a second RBW configuration for the first BWP configuration for a second slot based on the BWP switching trigger and the RBW configuration, the second RBW configuration different from the first RBW configuration; and operate, by the UE, according to the second RBW configuration during the second slot.

In another aspect of the disclosure, a method of wireless communication includes operating, by a network entity, according to a first BWP configuration for a first slot, the first BWP configuration having a first RBW configuration; determining, by the network entity, a BWP switching trigger and a RBW configuration; determining, by the network entity, a second RBW configuration for the first BWP configuration for a second slot based on the BWP switching trigger and the RBW configuration, the second RBW configuration different from the first RBW configuration; and operating, by the network entity, according to the second RBW configuration during the second slot.

In an additional aspect of the disclosure, an apparatus configured for wireless communication is disclosed. The apparatus includes means for operating, by a network entity, according to a first BWP configuration for a first slot, the first BWP configuration having a first RBW configuration; means for determining, by the network entity, a BWP switching trigger and a RBW configuration; means for determining, by the network entity, a second RBW configuration for the first BWP configuration for a second slot based on the BWP switching trigger and the RBW configuration, the second RBW configuration different from the first RBW configuration; and means for operating, by the network entity, according to the second RBW configuration during the second slot.

In an additional aspect of the disclosure, a non-transitory computer-readable medium having program code recorded thereon. The program code further includes code to operate, by a network entity, according to a first BWP configuration for a first slot, the first BWP configuration having a first RBW configuration; determine, by the network entity, a BWP switching trigger and a RBW configuration; determine, by the network entity, a second RBW configuration for the first BWP configuration for a second slot based on the BWP switching trigger and the RBW configuration, the second RBW configuration different from the first RBW configuration; and operate, by the network entity, according to the second RBW configuration during the second slot.

In an additional aspect of the disclosure, an apparatus configured for wireless communication is disclosed. The apparatus includes at least one processor, and a memory coupled to the processor. The processor is configured to operate, by a network entity, according to a first BWP configuration for a first slot, the first BWP configuration having a first RBW configuration; determine, by the network entity, a BWP switching trigger and a RBW configuration; determine, by the network entity, a second RBW configuration for the first BWP configuration for a second slot based on the BWP switching trigger and the RBW configuration, the second RBW configuration different from the first RBW configuration; and operate, by the network entity, according to the second RBW configuration during the second slot.

Other aspects, features, and embodiments will become apparent to those of ordinary skill in the art, upon reviewing the following description of specific, exemplary embodiments in conjunction with the accompanying figures. While features may be discussed relative to certain aspects and figures below, all embodiments can include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
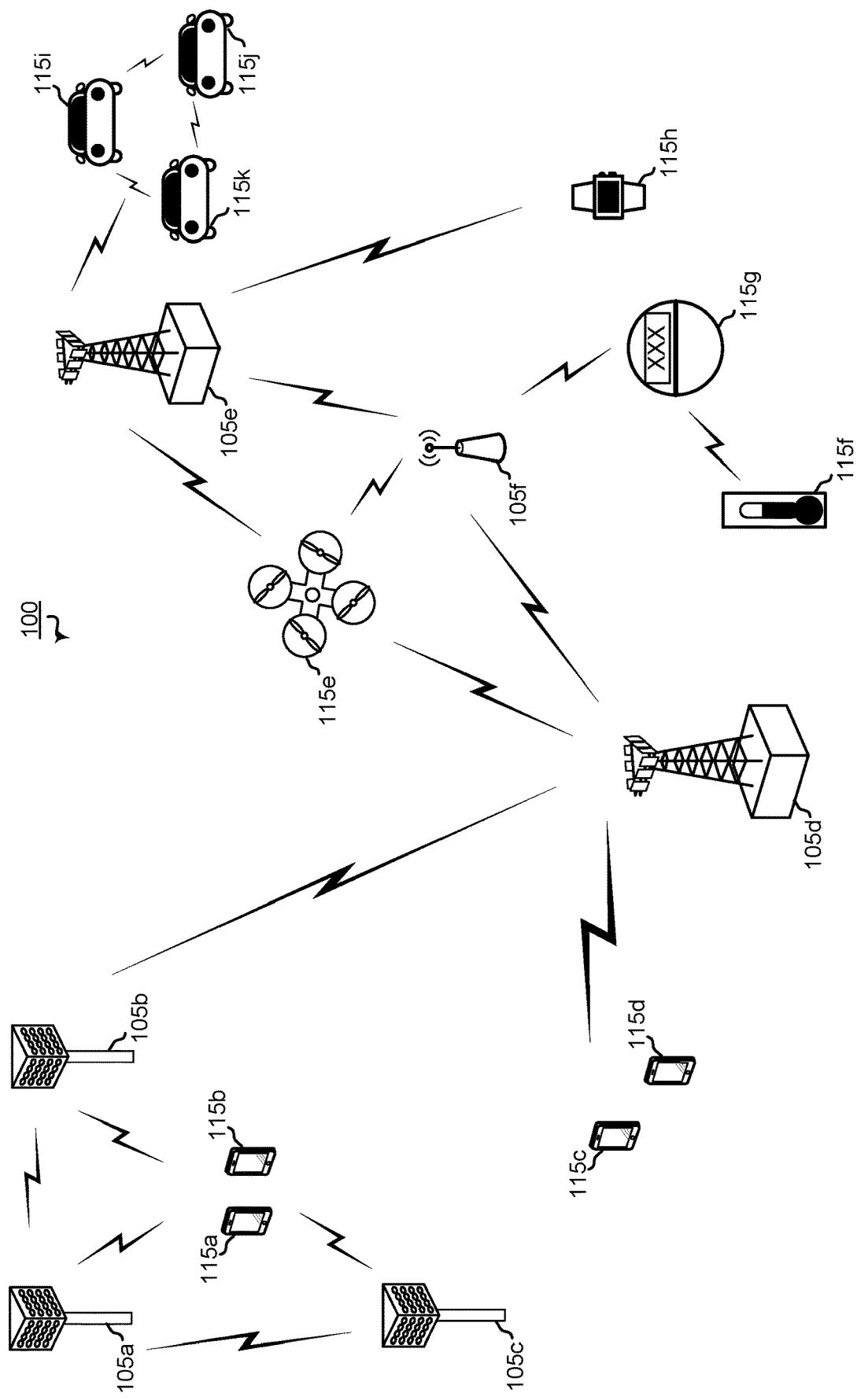
FIG. 1 is a block diagram illustrating details of a wireless communication system according to some embodiments of the present disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

According to some aspects, the present disclosure is related to bandwidth part (BWP) operations for full-duplex wireless communications. According to some aspects, the present disclosure provides teachings that can enable and provide improved flexibility and speed is using BWPs that have UL and DL resources bandwidths. The use of BWPs with UL and DL resources can enable full-duplex wireless communications within the BWP. That is, uplink and downlink transmission can be transmitted on the resources (e.g., time and frequency) of the BWP, such as a single BWP. Additionally, the use of BWPs with UL and DL can increase resource utilization and flexibility, while also reducing latency as compared to using both UL only BWPs and DL only BWPs.

Full-duplex wireless communications specifications may have a switching delay for switching an active BWP. To illustrate, when switching from a first BWP with a first frequency range to a second BWP with a second frequency range, the switching may cause resources to go unused due the time involved in the switching. Unused resources can cause delays in communications. In some examples, a delay may be a BWP switching delay period in which network bandwidth and spectrum are essentially wasted due to non-use. Techniques discussed herein can enhance network performance via improved usage of network bandwidth and spectrum by using a more flexible and quicker procedure.

According to some aspects, the present disclosure provides teachings that can enable and provide improved flexibility and speed is resource bandwidths (RBWs). RBWs can generally be thought of or defined as portions of a bandwidth resource, such as a bandwidth part (BWP). In other words, a BWP may comprise one or more resource BWs or RBWs. RBWs represent sub-portions of a BWP, such as discreet, divisible portions of a BWP. A BWP can include one or more UL RBWs, DL RBWs, or joint RBWs of varying sizes and/or direction. In some scenarios, RBWs offer more flexibility and granularity than BWPs. And by configuring/reconfiguring one or more RBWs of a BWP, network spectrum can be adjusted more quickly (e.g., such as from slot to slot). Quick adjustments help to decrease or remove delays so that spectrum adjustment may occur without delay). In some scenarios, a BWP can be adjusted and customized without the delay incurred of switching the BWP, i.e., switching the bandwidth or size of the BWP. Such techniques can improve usage of network bandwidth and spectrum, resulting in higher throughput and lower latency.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks (sometimes referred to as "5G NR" networks/systems/devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The Third Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. Additionally, an operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects descried with reference to one technology may be understood to be applicable to another technology. Indeed, one or more aspects of the present disclosure are related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described embodiments. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 is a block diagram illustrating details of an example wireless communication system. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as user equipment (UE) in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component device/module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink and/or uplink, or desired transmission between base stations, and backhaul transmissions between base stations. UEs may operate as base stations or other network nodes in some scenarios. Backhaul communication between base stations of wireless network 100 may occur using wired and/or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD/FDD communications, such as in a vehicle-to-vehicle (V2V) mesh network between UEs 115i-115k communicating with macro base station 105e.

Figure 2:
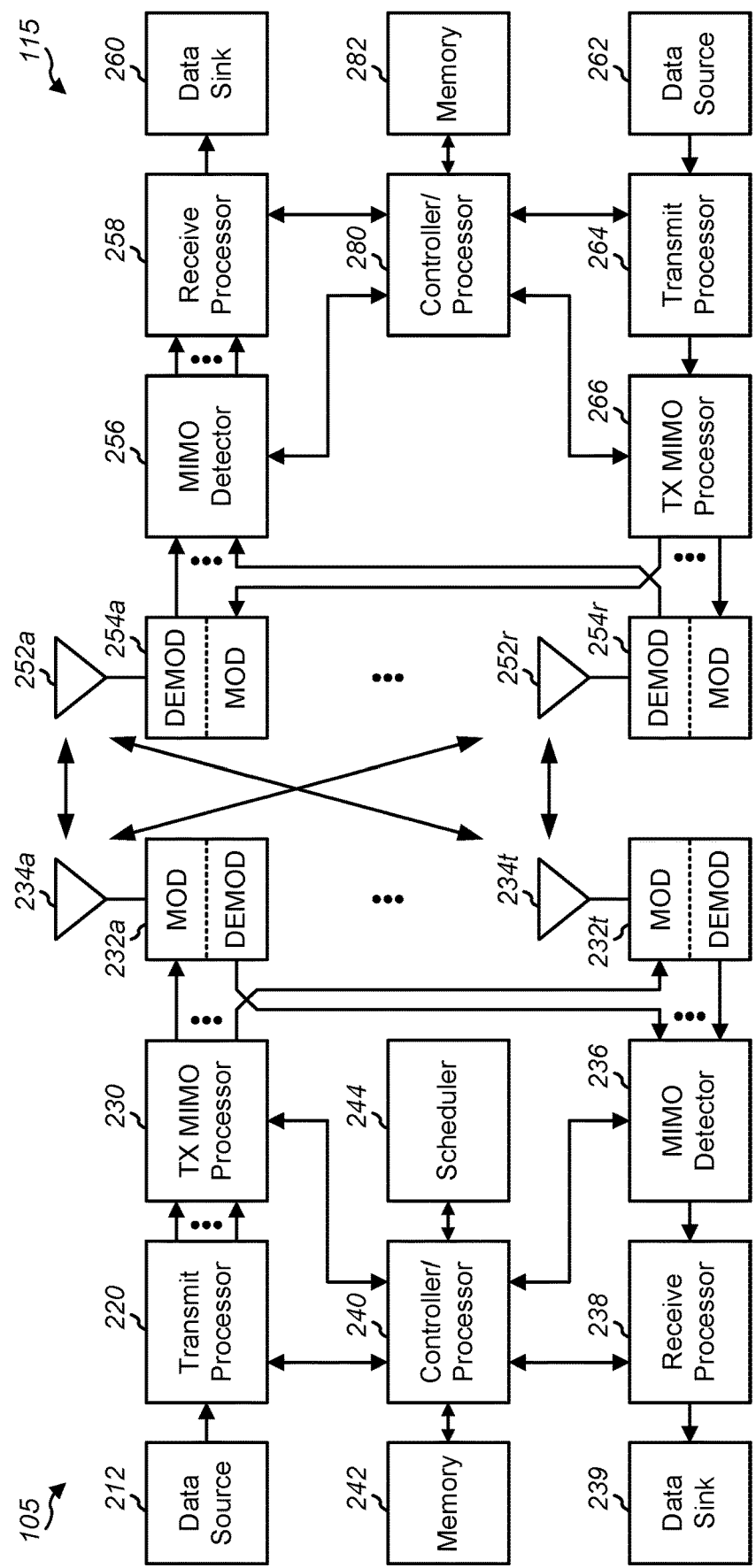
FIG. 2 is a block diagram conceptually illustrating a design of a base station and a UE configured according to some embodiments of the present disclosure.

FIG. 2 shows a block diagram conceptually illustrating an example design of a base station 105 and a UE 115, which may be any of the base stations and one of the UEs in FIG. 1. For a restricted association scenario (as mentioned above), base station 105 may be small cell base station 105f in FIG. 1, and UE 115 may be UE 115c or 115D operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, the antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller/processor 280.

On the uplink, at UE 115, transmit processor 264 may receive and process data (e.g., for the physical uplink shared channel (PUSCH)) from data source 262 and control information (e.g., for the physical uplink control channel (PUCCH)) from controller/processor 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at base station 105 and UE 115, respectively. Controller/processor 240 and/or other processors and modules at base station 105 and/or controller/processor 280 and/or other processors and modules at UE 115 may perform or direct the execution of various processes for the techniques described herein, such as to perform or direct the execution illustrated in FIGS. 9 and 10, and/or other processes for the techniques described herein. Memories 242 and 282 may store data and program codes for base station 105 and UE 115, respectively. Scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Spectrum access control may be done in a variety of manners. In some deployments, for example, access to the shared spectrum and the arbitration of time resources among different network operating entities may be centrally controlled. Central control may be done by a separate entity (e.g., a scheduling entity, a base station, etc.). In some deployments, spectrum control may be autonomously determined by a predefined arbitration scheme. In still yet other arrangements or deployments (alternatively or additionally), spectrum control may be dynamically determined based on interactions between wireless nodes of the network operators.

In some cases, UE 115 and base station 105 may operate in a shared radio frequency spectrum band. Some shared bands may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Figure 3A:
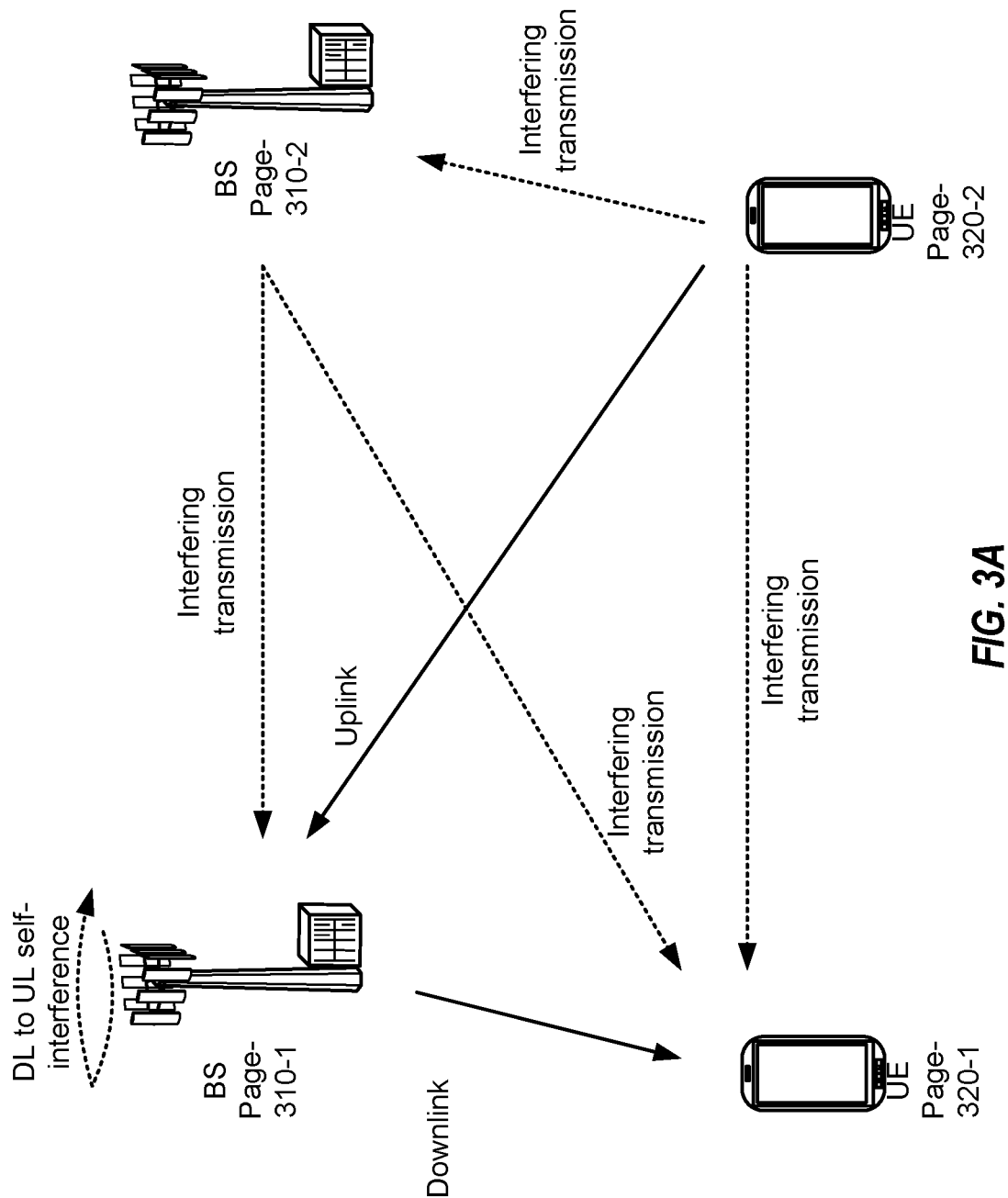
FIG. 3A is a diagram of a first example of full-duplex operations according to some embodiments of the present disclosure.
Figure 3B:
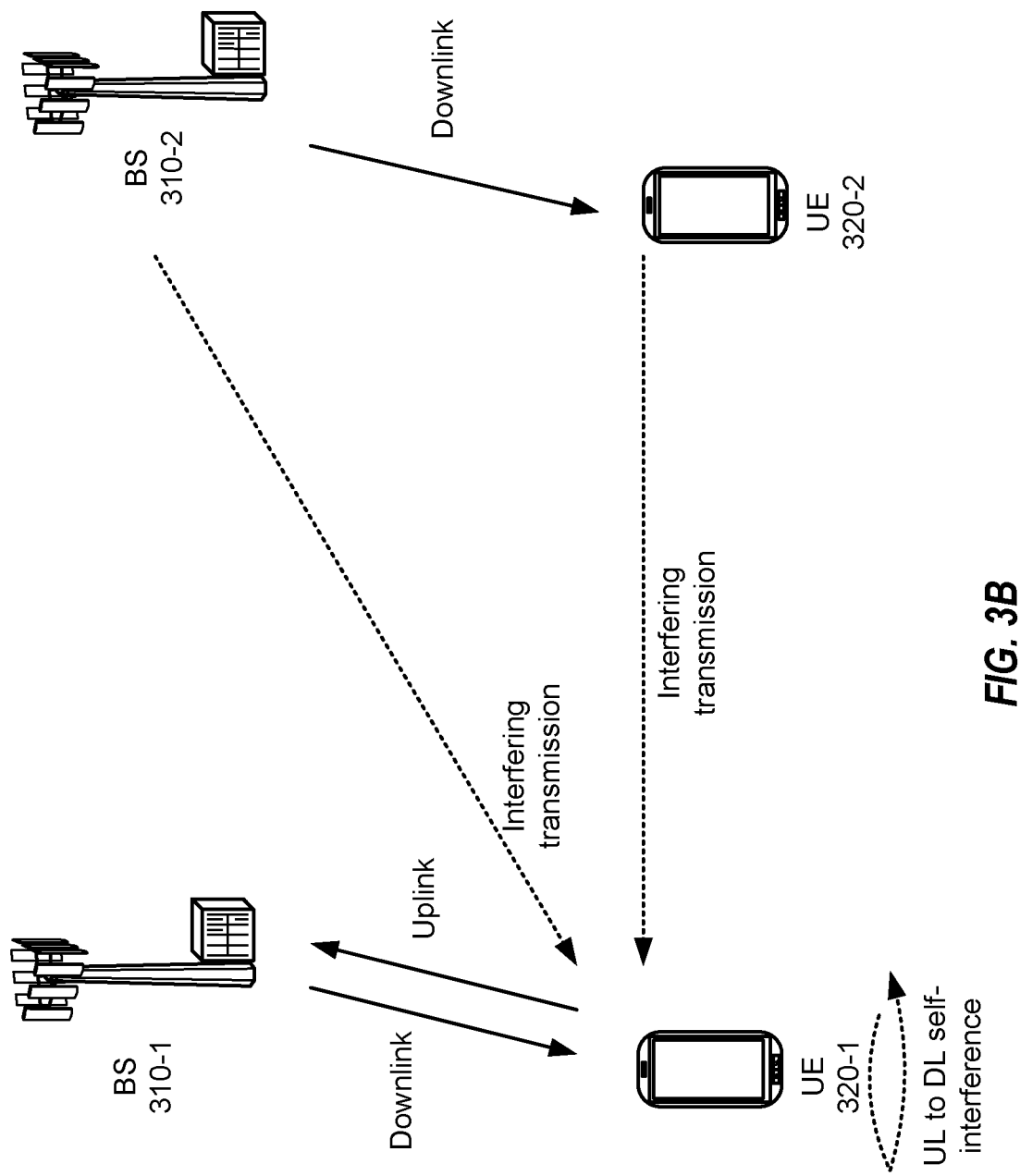
FIG. 3B is a diagram of a second example of full-duplex operations according to some embodiments of the present disclosure.
Figure 3C:
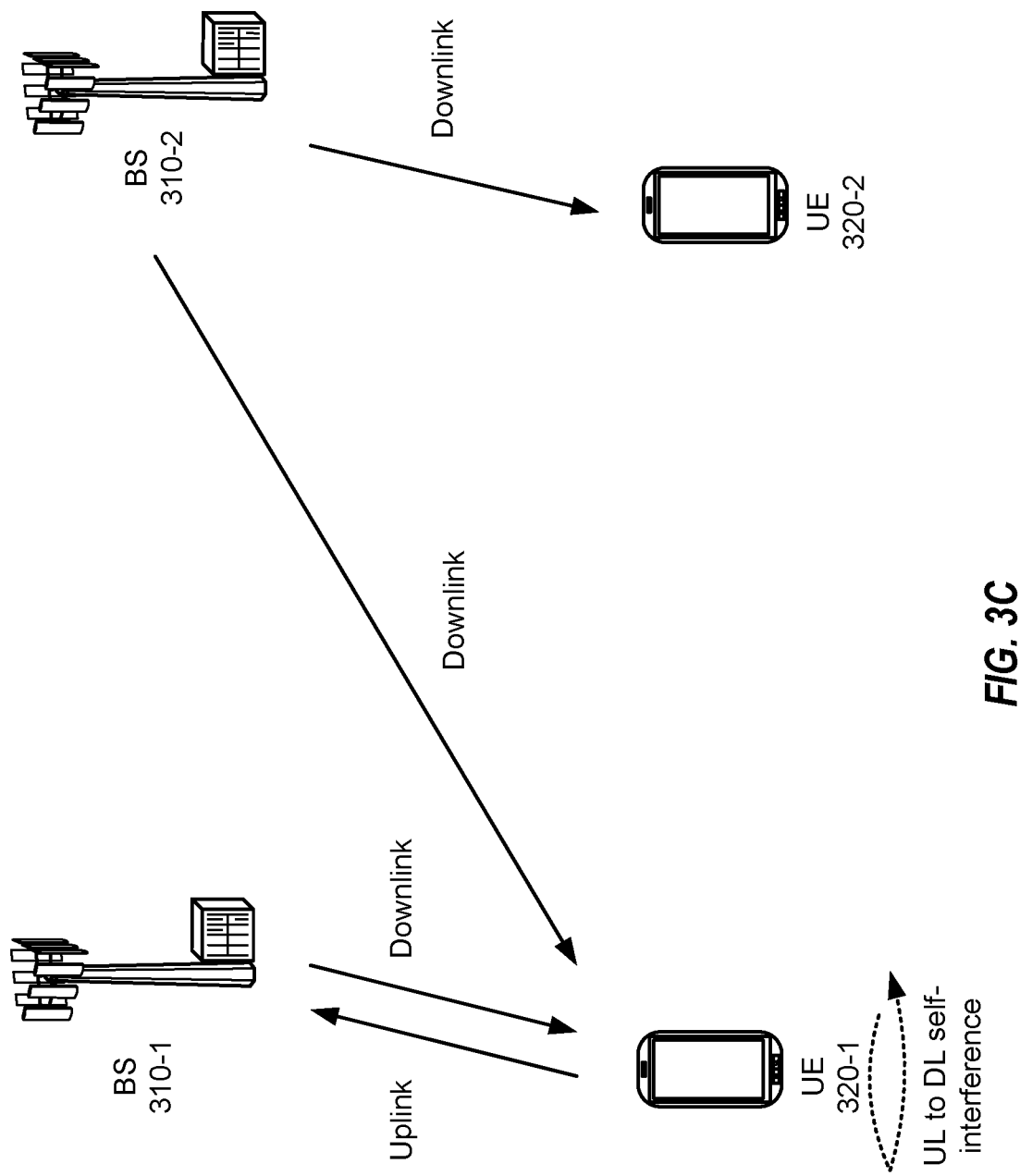
FIG. 3C is a diagram of a third example of full-duplex operations according to some embodiments of the present disclosure.

FIGS. 3A, 3B, and 3C illustrate examples of full-duplex communication modes. In FIG. 3A, full-duplex base station and half-duplex UE operations are shown, in FIG. 3B, full-duplex base station and full-duplex UE operations are shown, and in FIG. 3C, full-duplex UE operations with multiple transmission reception points (TRPs) are shown. In some deployments, full-duplex operation generally corresponds to transmitting and/or receiving data via multiple antennas at the same time or substantially the same time. In some instances, half-duplex operation generally corresponds to transmitting or receiving data via a single antenna at a particular time.

FIGS. 3A, 3B, and 3C depict interference caused from full-duplex operations. To illustrate, external interference and self-interference may be caused during full-duplex operations. External interference is caused from external sources, such as a from a nearby UE or base station. Self-interference is caused by the device. Self-interference may be caused by leakage, such as when transmitting energy from a transmitting antenna is received by receiving antenna directly or indirectly (e.g., by reflection).

In FIGS. 3A, 3B, and 3C, multiple TRPs are illustrated, such as a first TRP (TRP1) and a second TRP (TRP2). The first and second TRPs may include or correspond to the same base station, such as the same gNB, or to different base stations. In FIGS. 3A, 3B, and 3C, the first TRP (TRP1) may be operating in the same frequency band or in different frequency bands. For example, the first TRP (TRP1) may be operating in a first frequency band, such as FR 4 or 60 GHz, and the second TRP (TRP2) may be operating in a second frequency band, such as FR 2 or 28 GHz.

Additionally, multiple UEs are illustrated in FIGS. 3A, 3B, and 3C, such as a first UE (UE1) and a second UE (UE2) In some implementations, the UE is a full-duplex capable UE with one or more antenna modules. FIGS. 3A, 3B, and 3C further depict signal paths between the TRPs and the UEs.

Referring to FIG. 3A, FIG. 3A illustrates an example diagram 300 for a first type of full-duplex communication. Referring to FIG. 3A, the diagram 300 illustrates two signal paths (beam paths) between the TRPs and the UEs and example interference. In the example illustrated in FIG. 3A, the first TRP (TRP1) transmits downlink data via a first signal path to the first UE (UE1) and the first TRP (TRP2) receives uplink data via a second signal path from the second UE (UE2). The first TRP and UE experience interference. For example, the first TRP experiences self-interference from simultaneously transmitting and receiving. Additionally, devices receive interference caused by other nearby devices. For example, operations of the second TRP 2 may cause interference at all other nodes, such as the first UE and first TRP as illustrated in FIG. 3A. Additionally, the transmission of uplink data by the second UE may cause interference at the second TRP.

Referring to FIG. 3B, FIG. 3B illustrates an example diagram 310 for a second type of full-duplex communication. Referring to FIG. 3B, the diagram 310 illustrates two signal paths (beam paths) between the TRPs and the UEs and example interference. In the example illustrated in FIG. 3B, the first TRP (TRP1) transmits downlink data via a first signal path to the first UE (UE1) and the first TRP (TRP1) receives uplink data via a second signal path from the first UE (UE1). Additionally, the second TRP (TRP2) transmits downlink data via a third signal path to the second UE (UE2). The first TRP experiences interference. For example, the first TRP experiences self-interference from simultaneously transmitting and receiving and from the operations of the second TRP and UE. Additionally, other devices may receive interference caused by the operation other nearby devices, as described with reference to FIG. 3A.

Referring to FIG. 3C, FIG. 3C illustrates an example diagram 320 for a third type of full-duplex communication. Referring to FIG. 3C, the diagram 320 illustrates three signal paths (beam paths) between the TRPs and the UEs and example interference. In the example illustrated in FIG. 3C, the first TRP (TRP1) receives uplink data via a first signal path from the first UE (UE1), and the first TRP (TRP2) transmits downlink data via a second signal path to the first UE and via a third signal path the second UE. The first TRP may experience interference. For example, the first TRP experiences self-interference from simultaneously transmitting and receiving. Additionally, other devices may receive interference caused by the operation other nearby devices, as described with reference to FIG. 3A.

Figure 3F:
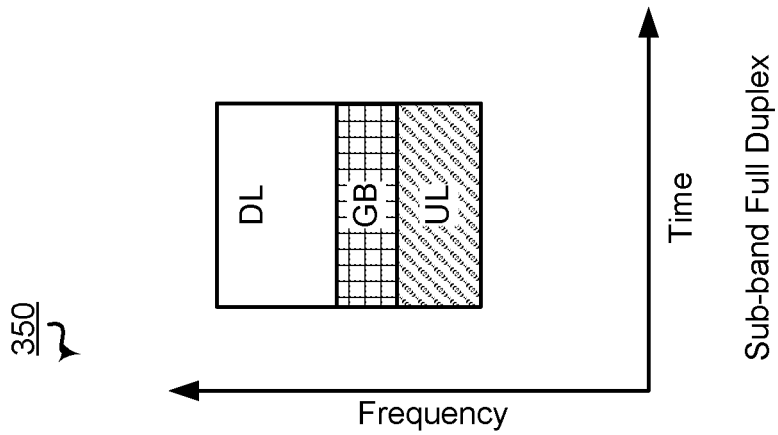
FIG. 3F is a diagram of a sixth example of full-duplex operations according to some embodiments of the present disclosure.
Figure 3E:
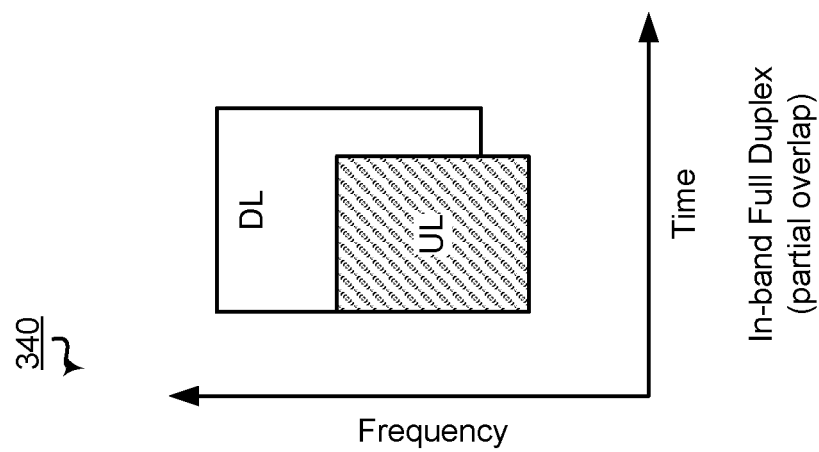
FIG. 3E is a diagram of a fifth example of full-duplex operations according to some embodiments of the present disclosure.
Figure 3D:
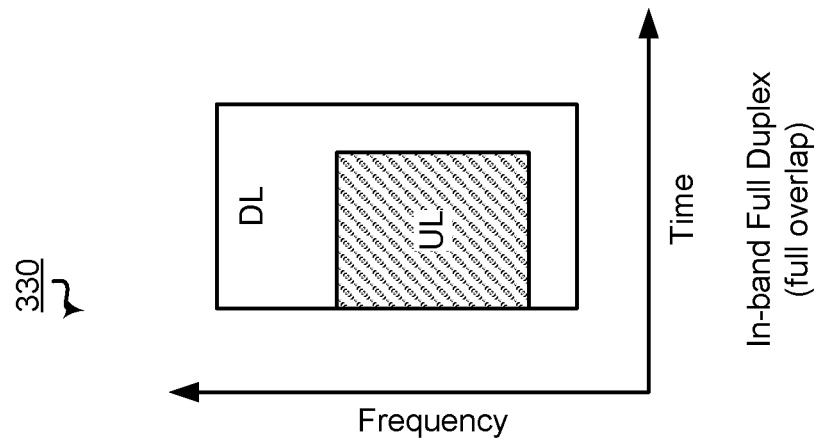
FIG. 3D is a diagram of a fourth example of full-duplex operations according to some embodiments of the present disclosure.

FIGS. 3D, 3E, and 3F illustrate examples of full-duplex communication operations. In FIGS. 3D and 3F, in-band full-duplex (IBFD) operations are shown, and in FIG. 3E sub-band full-duplex operations are shown. In some deployments, in-band full-duplex (IBFD) operation corresponds to transmitting and receiving on the same time and frequency resources. As shown in diagrams 330 and 340 of FIGS. 3D and 3E, the downlink and uplink resources share the same time and frequency resource. The downlink and uplink resources may fully or partially overlap, as shown in FIGS. 3D and 3E respectively. In some deployments, sub-band full-duplex operation, often referred to as frequency division duplexing (FDD) or flexible duplex, corresponds to transmitting and receiving data at the same time but on different frequency resources. As shown in diagram 350 of FIG. 3F, the downlink resource is separated from the uplink resource by a relatively "thin" guard band. The guard band in FIG. 3F is enlarged for illustrative purposes. The guard band is what generally distinguishes SBFD from paired spectrum (e.g., IBFD) in current wireless standard specifications.

Cross-division duplex (xDD) is an advanced duplex scheme where a device operates on UL and DL on the same time division duplex (TDD) carrier, but on different frequency resources. xDD can enhance uplink (UL) coverage in TDD carriers by utilizing self-interference cancellation (SIC) capability at a base station. With xDD, it is possible to combine TDD's ability to efficiently handle asymmetric UL and downlink (DL) traffic with frequency division duplex's coverage advantage. xDD may be used with SBFD or IBFD.

Figures 3G, 3H:
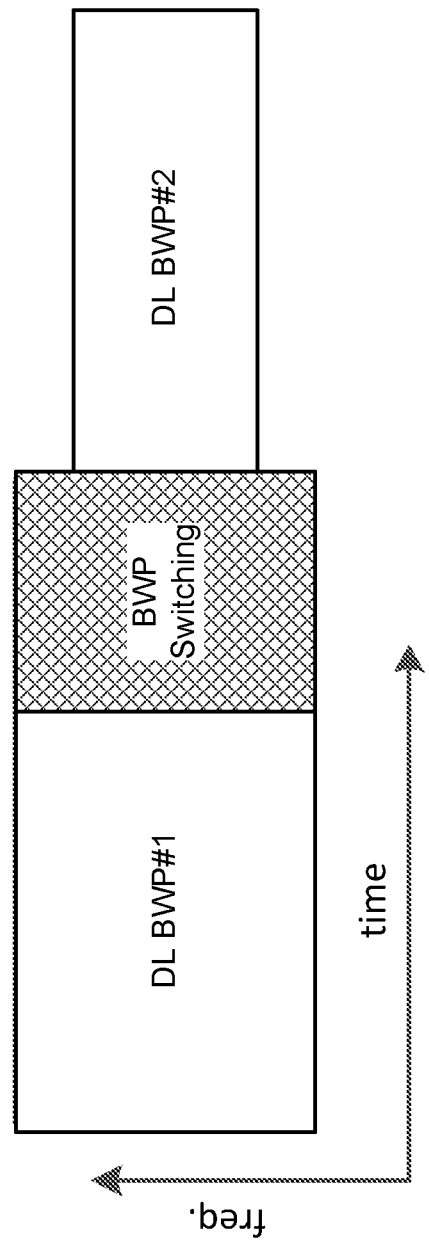
FIG. 3G is a diagram of an example of a BWP switching delay table according to some embodiments of the present disclosure.
FIG. 3H is a diagram that illustrates a time delay in slots caused by switching a bandwidth of a DL BWP according to some embodiments of the present disclosure.

FIGS. 3G and 3H illustrate an example of BWP switching delay. FIG. 3G illustrates an BWP switching delay table 360 and FIG. 3H illustrates a time delay 370 in slots caused by switching a frequency/bandwidth of a DL BWP. Referring to FIG. 3G, a delay incurred in BWP switching is dependent on time and UE capability. To illustrate, the slot length (time in milliseconds) and type of the UE (Type 1 or Type 2) can be used to determine a delay in slots based on the table of FIG. 3G. The delay may also be dependent on sub-carrier spacing. As illustrated, if a sub-carrier spacing (SCS) changes, then the BWP switching delay is the larger of the two delays for the two types of UEs.

Referring to FIG. 3H, a first DL BWP (DL BWP1) is switched to a second DL BWP (DL BWP2). In the example of FIG. 3H, the bandwidth/frequency range of the DL BWP is reduced. This switch causes a delay where no data is transmitted or received by the wireless communication device. As this example is for DL, no DL data is transmitted by the base station and no DL data is received by the UE. As the BWPs proposed herein include DL BWPs, UL BWPs, and joint BWPS (e.g., DL/UL BWPs), both UEs and base stations may face switching delays and wasted transmit or receive opportunities.

Figure 4:
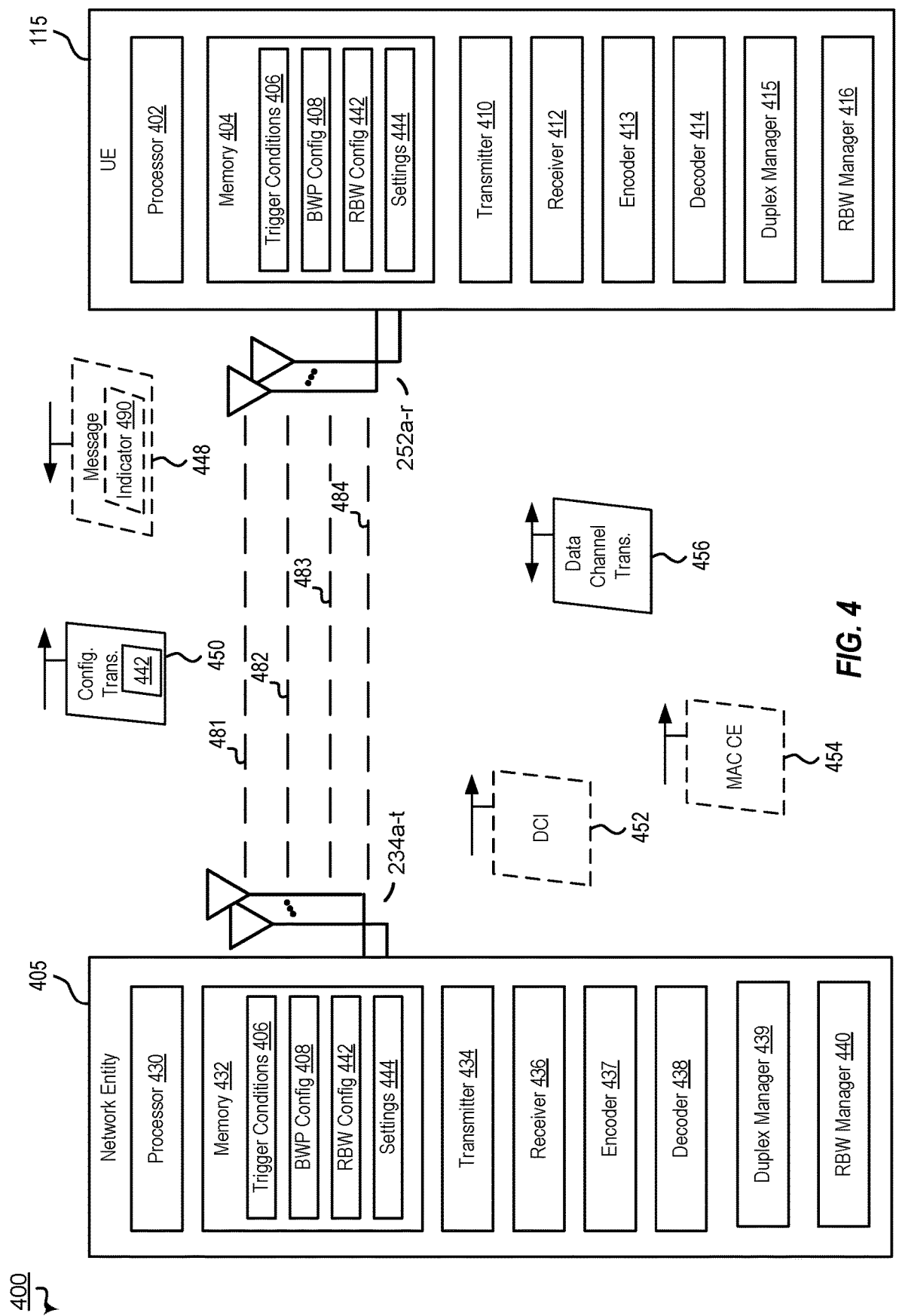
FIG. 4 is a block diagram illustrating an example of a wireless communications system (with a UE and base station) with joint BWPs for full-duplex operations according to some embodiments of the present disclosure.

FIG. 4 illustrates an example of a wireless communications system 400 that supports joint downlink and uplink bandwidth part operations for full-duplex wireless communication modes in accordance with aspects of the present disclosure. In some examples, wireless communications system 400 may implement aspects of wireless communication system 100. For example, wireless communications system 400 may include UE 115 and network entity 405. Joint downlink and uplink bandwidth part operations for full-duplex wireless communication modes may increase throughput and reliability by increasing flexibility and reducing switching delay. Thus, network and device performance can be increased.

Network entity 405 and UE 115 may be configured to communicate via frequency bands, such as FR1 having a frequency of 410 to 7125 MHz, FR2 having a frequency of 24250 to 52600 MHz for mm-Wave, and/or one or more other frequency bands. It is noted that SCS may be equal to 15, 30, 60, or 120 kHz for some data channels. Network entity 405 and UE 115 may be configured to communicate via one or more component carriers (CCs), such as representative first CC 481, second CC 482, third CC 483, and fourth CC 484. Although four CCs are shown, this is for illustration only, more or fewer than four CCs may be used. One or more CCs may be used to communicate control channel transmissions, data channel transmissions, and/or sidelink channel transmissions.

Such transmissions may include a Physical Downlink Control Channel (PDCCH), a Physical Downlink Shared Channel (PDSCH), a Physical Uplink Control Channel (PUCCH), a Physical Uplink Shared Channel (PUSCH), a Physical Sidelink Control Channel (PSCCH), a Physical Sidelink Shared Channel (PSSCH), or a Physical Sidelink Feedback Channel (PSFCH). Such transmissions may be scheduled by aperiodic grants and/or periodic grants.

Each periodic grant may have a corresponding configuration, such as configuration parameters/settings. The periodic grant configuration may include configured grant (CG) configurations and settings. Additionally, or alternatively, one or more periodic grants (e.g., CGs thereof) may have or be assigned to a CC ID, such as intended CC ID.

Each CC may have a corresponding configuration, such as configuration parameters/settings. The configuration may include bandwidth, bandwidth part, HARQ process, TCI state, RS, control channel resources, data channel resources, or a combination thereof. Additionally, or alternatively, one or more CCs may have or be assigned to a Cell ID, a Bandwidth Part (BWP) ID, or both. The Cell ID may include a unique cell ID for the CC, a virtual Cell ID, or a particular Cell ID of a particular CC of the plurality of CCs. Additionally, or alternatively, one or more CCs may have or be assigned to a HARQ ID. Each CC may also have corresponding management functionalities, such as, beam management, BWP switching functionality, or both. In some implementations, two or more CCs are quasi co-located, such that the CCs have the same beam and/or same symbol.

In some implementations, control information may be communicated via network entity 405 and UE 115. For example, the control information may be communicated suing MAC-CE transmissions, RRC transmissions, DCI, transmissions, another transmission, or a combination thereof.

UE 115 can include a variety of components (e.g., structural, hardware components) used for carrying out one or more functions described herein. For example, these components can includes processor 402, memory 404, transmitter 410, receiver 412, encoder, 413, decoder 414, Duplex manager 415, RBW manager 416 and antennas 252*a-r*. Processor 402 may be configured to execute instructions stored at memory 404 to perform the operations described herein. In some implementations, processor 402 includes or corresponds to controller/processor 280, and memory 404 includes or corresponds to memory 282. Memory 404 may also be configured to store trigger condition data 406, BWP configuration data 408, RBW configuration data 442, settings data 444, or a combination thereof, as further described herein.

The trigger condition data 406 includes or corresponds to data associated with or corresponding to transmit trigger condition information. For example, the trigger condition data 406 may indicate one or more possible trigger conditions and/or an active trigger condition or conditions. The trigger condition data 406 may also include thresholds or data used to evaluate the trigger conditions, such as a DCI indicator value of 1 corresponds to switching the BWP/RBW configuration. Additionally or alternatively, trigger conditions may be static, dynamic, or variable based on desired operational conditions.

The BWP configuration data 408 includes or corresponds to data indicating or corresponding to BWP configurations. For example, the BWP configuration data 408 may indicate possible BWP configurations and/or an active (e.g., currently used) BWP configuration. In some implementations, the BWP configuration data 408 may further indicate whether a particular UL BWP (e.g., a particular UL RBW portion thereof) or whether UL RBWs in general are configured for RACH procedures, such as contain RACH configurations.

As mentioned above, a BWP may comprise one or more RBWs. Because RBWs may be defined in one or more BWPs, configurations for RBWs may vary. RBW configurations can be based on one or more RBW configuration parameters, such as RBW configuration data 442. The RBW configuration data 442 includes or corresponds to data that indicates a portion of a BWP or a sub-BWP resource unit, such as a RBW configuration of a BWP. The RBW configuration data 442 may be used to indicate a particular active RBW (or primary RBW) of an active (e.g., currently used) BWP configuration or may indicate a particular configuration of RBWs. The RBW configuration data 442 may further include possible RBW configurations for the possible BWP configurations indicated by the BWP configuration data 408. The RBW configuration data 442 may further include one or more of RBW default settings, RBW timer settings, UL and DL association settings, etc.

The settings data 444 includes or corresponds to data associated with joint BWP operations. The settings data 444 may include one or more types of joint BWP operation modes and/or thresholds or conditions for switching BWP modes and/or configurations. For example, the settings data 444 may have data indicating different thresholds for different full-duplex modes, such as IUD and SBFD modes.

Transmitter 410 is configured to transmit data to one or more other devices, and receiver 412 is configured to receive data from one or more other devices. For example, transmitter 410 may transmit data, and receiver 412 may receive data, via a network, such as a wired network, a wireless network, or a combination thereof. For example, UE 115 may be configured to transmit and/or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 410 and receiver 412 may be replaced with a transceiver. Additionally, or alternatively, transmitter 410, receiver, 412, or both may include or correspond to one or more components of UE 115 described with reference to FIG. 2.

Encoder 413 and decoder 414 may be configured to encode and decode data for transmission. Duplex manager 415 may be configured to determine and perform full-duplex mode management and operations. For example, Duplex manager 415 is configured to control and coordinate full-band duplex operations. RBW manager 416 may be configured to determine to a particular RBW configuration. For example, RBW manager 416 is configured to determine and/or select a BWP and/or RBW configuration.

Network entity 405 includes processor 430, memory 432, transmitter 434, receiver 436, encoder 437, decoder 438, Duplex manager 439, RBW manager 440, and antennas 234*a-t*. Processor 430 may be configured to execute instructions stores at memory 432 to perform the operations described herein. In some implementations, processor 430 includes or corresponds to controller/processor 240, and memory 432 includes or corresponds to memory 242. Memory 432 may be configured to store trigger condition data 406, BWP configuration data 408, RBW configuration data 442, settings data 444, or a combination thereof, similar to the UE 115 and as further described herein.

Transmitter 434 is configured to transmit data to one or more other devices, and receiver 436 is configured to receive data from one or more other devices. For example, transmitter 434 may transmit data, and receiver 436 may receive data, via a network, such as a wired network, a wireless network, or a combination thereof. For example, network entity 405 may be configured to transmit and/or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 434 and receiver 436 may be replaced with a transceiver. Additionally, or alternatively, transmitter 434, receiver, 436, or both may include or correspond to one or more components of network entity 405 described with reference to FIG. 2.

Encoder 437, and decoder 438 may include the same functionality as described with reference to encoder 413 and decoder 414, respectively. Duplex manager 439 may include similar functionality as described with reference to Duplex manager 415. RBW manager 440 may include similar functionality as described with reference to RBW manager 416.

During operation of wireless communications system 400, network entity 405 may determine that UE 115 has joint BWP capability, and thus RBW configuration/switching. For example, UE 115 may transmit a message 448 that includes a joint BWP operation indicator 490 (e.g., a RBW configuration indicator). Indicator 490 may indicate joint BWP operation capability or a particular type or mode of joint BWP operation. In some implementations, network entity 405 sends control information to indicate to UE 115 that joint BWP operation and/or a particular type of joint BWP operation is to be used. For example, in some implementations, message 448 (or another message, such as configuration transmission 450) is transmitted by the network entity 405. The configuration transmission 450 may include or indicate to joint BWP operation or to adjust or implement a setting of a particular type of joint BWP operation.

During operation, devices of wireless communications system 400, perform joint BWP operations. For example, the UE 115 determines a trigger condition or conditions for initiating an RBW configuration change. Exemplary trigger conditions include DCI indication, timer expiration, RRC indication, etc. UE 115 may evaluate one or more trigger conditions each slot to determine if a RBW configuration is to be adjusted. As an example, the network entity 405 may transmit a DCI transmission 452 (e.g., PDCCH transmission) to UE 115 which indicates a RBW configuration. To illustrate, the DCI transmission 452 may include an indicator (e.g., one or more indicator bits which indicate a particular RBW configuration for an active BWP in an upcoming slot. The UE 115 may change the RBW configuration for the upcoming slot. The particular change or adjustment to the RBW configuration may involve a change in the active BWP in some implementations. Alternatively, the network entity 405 may transmit a MAC CE transmission 454 to UE 115 which indicates the RBW configuration. The MAC CE transmission 454 may include a similar indicator as the DCI transmission 452. Details of such dynamic (e.g., DCI or MAC CE based) RBW configuration changes, are described further herein.

As another example, the UE 115 may initiate inactivity timers for RBWs of a current BWP. To illustrate, the UE 115 may start an inactivity timer for each RBW of a current BWP upon selection/activation of the current BWP. The UE 115 may then restart/reset timers of individual RBWs when the corresponding RBW is selected or used by the UE 115, such as via dynamic signaling (e.g., DCI signaling). Alternatively, the UE 115 may start an inactivity timer for each RBW of a current BWP upon selection/use of each RBW. Responsive to expiration of one or more RBW timers, the UE 115 may change the RBW configuration for the upcoming slot. The particular change or adjustment to the RBW configuration may involve a change in the active BWP in some implementations. Details of such inactivity timer expiration based RBW configuration changes, are described further herein.

As yet another example, the UE 115 may evaluate and determine if a current BWP supports RACH procedures. To illustrate, the UE 115 may evaluate UL RBWs of a current BWP upon selection/activation of the current BWP upon a condition, such as upon expiration of a timer (e.g., RACH configuration check timer), upon RBW configuration (e.g., RBW selection), etc., or every slot. Responsive to determining that at least one UL RBW is not configured for RACH procedures, the UE 115 may change the RBW configuration for the upcoming slot. The particular change or adjustment to the RBW configuration may involve a change in the active BWP in some implementations. Details of such RACH configuration (e.g., MAC element) based RBW configuration changes, are described further herein.

After evaluating the trigger conditions and determining that a trigger condition for changing the particular RBW exists, the UE 115 determines the particular RBW configuration or configuration change. The UE 115 may then change/set the RBWs of the active BWP or may switch the BWP itself, such that the new active BWP part has the particular RBW configuration indicated by the evaluation of trigger conditions. While the above has been described with reference to the UE 115, the network entity 105 similarly evaluates trigger conditions and determines the new RBW configuration. Thus, the UE 115 and network entity 405 determine the RBW configuration data 442 based on the trigger conditions and the BWP configuration data 408.

The network entity 405 and UE 115 perform data channel transmissions 456 according to the RBW configuration indicated by RBW configuration data 442 for the upcoming slot. For example, the network entity 405 transmits a DCI for the slot to schedule UL and DL transmissions for the slot. This DCI may be the same DCI, i.e., DCI 452) that was used to indicate the RBW configuration/configuration change. Alternatively, if the trigger condition is timer based or MAC element based, the network entity 405 may not transmit a DCI or other transmission to indicate a RBW configuration change and/or a DCI transmitted by the network entity 405 for scheduling may not include an RBW configuration indicator.

Based on the scheduled UL and DL transmissions indicated by the DCI and the determined RBW configuration, the network entity 405 transmits downlink data (e.g., DL symbols) and the UE 115 transmits uplink data (UL symbols).

Accordingly, the UE 115 and network entity 405 may be able to transmit and receive information with different RBW configurations in sequential/consecutive slots.

Thus, FIG. 4 describes enhanced BWP configurations and operations for full-duplex operations. Using joint BWPs and trigger-based RBW configurations may enable improvement when operating in full-duplex modes. Performing joint BWPs and trigger-based RBW configurations operation enables reduced bandwidth/spectrum waste when switching and thus, enhanced UE and network performance by increasing throughput and reducing latency.

The joint BWP described here may be an UL and DL BWP with both UL and DL RBWs. The RBWs may include a set of RBWs are configured for DL only and a set of RBWs are configured for UL only or may include a set of RBWs that can be configured with 4 or more DL/UL BWPs. The DL only and UL only RBWs (i.e., separate RBWs) may be particularly useful for SBFD, and the flexibility of configurable/joint RBWs (i.e., RBWs that are configurable for UL or DL) may be particularly useful for IBFD.

The joint BWP may include a plurality of RBWs, such as 8 in an illustrative, non-limiting example. Thus, the joint BWP may include 4 DL RBWs and 4 UL RBWs or 6 DL RBWs and 2 UL RBWs in such examples of 8 RBWs. Alternatively, the joint BWP may include 8 UL/DL RBWs or 4 UL/DL RBWs, 4 DL RBWs, and 4 UL RBWs.

When both UL only and DL only RBWs are used, the RBWs of the joint BWP may have separate IDs or the same ID. To illustrate, DL RBW1 DL RBW2 and UL RBW1 and UP RBW2, or RBW1-RBW4 where 1 and 2 are DL and 3 and 4 are uplink. The separate IDs may be similar to BWP identification for FDD, and the same IDs may be similar to BWP in TDD.

The RBW configuration of the bandwidth part may be switched by one or more trigger conditions. The trigger conditions may include DCI indication, inactivity timers, MAC-CE, or a combination thereof. Thus, the RBW configuration of the bandwidth part BWP may be switched dynamically (DCI), based on prior use (timer), based on MAC configurations, and/or statically/semi-statically (RRC).

With regards to dynamic switching, upon receiving a DL scheduling or UL grant, the UE determines the BWP and the resource BW from the scheduling DCI. For example, the DCI may include an indicator (e.g., one or more indicator bits) which identifies the RBW configuration.

Although the following is explained for DL scheduling, similar operations may apply for UL grants. In a DL scheduling case, when a DL RBW is switched, the UL RBW can experience different things. For example, the UL RBW can stay the same (not change). As another example, the UL RBW changes according to some association between the DL RBW and UL RBW. The UL RBW change association may be predefined or configurable, such as RRC configured. To illustrate, if DL RBW1 is active, this implies that UL RBW1 has to be active. Thus, upon a switch from another DL RBW to DL RBW1, the UL switches to UL RBW1 (or maintains on UL RBW1).

Similarly, in a UL scheduling case when a UL BWP is switched, the UE determines the new BWP and resource BW according to the scheduling DCI. For example, the DL RBW can stay the same (not change). As another example, the DL RBW changes according to some association between the DL RBW and UL RBW. As described above, the DL RBW change association may be predefined or configurable, such as RRC configured. To illustrate, if UL RBW1 is active, this implies that DL RBW1 has to be active. Thus, upon a switch from another UL RBW to UL RBW1, the DL RBW switches to DL RBW1 (or maintains on DL RBW1)

With regards to inactivity timer switching, one or more RBW's of the BWP part may have corresponding inactivity timers. Such RBW inactivity timers may be used in addition to conventional inactivity timers for the BWP.

In some implementations where some of the RBWs have inactivity timers, if a RBW timer is missing from a particular RBW, the UE may not switch back to a default RBW via any timer, such as an RBW inactivity timer, the BWP inactivity timer, or a combination thereof. Such an operations may be useful in case the gNB wants to configure a timer for DL resource BW and not for the UL.

Additionally, an inactivity timer for the BWP may/may not be defined. In cases where an inactivity timer for a BWP expires, and the UE may switch the entire BWP to a new (default by configuration) DL/UL BWP with both resource BW for DL and UL. Alternatively, the UE may switches to a separate default DL BWP and a default UL BWP.

With regards to MAC entity switching, the UE might determine to switch at least a portion of the BWP based on RACH capabilities. For example, the UE may switch the UL resource BW or the UL BWP because RACH procedures are not configured for the active resource BW or BWP.

For a given BWP, at least one UL resource BW should have RACH configurations. If for the given DL/UL BWP, no resource BW includes RACH configurations, the UE may switch the joint BWP to the default UL BWP containing RACH configurations. DL configuration stays according to the joint BWP Alternatively, the UE may switch the joint BWP to a default joint BWP with a resource BW containing RACH configurations or switch the joint BWP to a default UL BWP and a default DL BWP.

Figure 5:
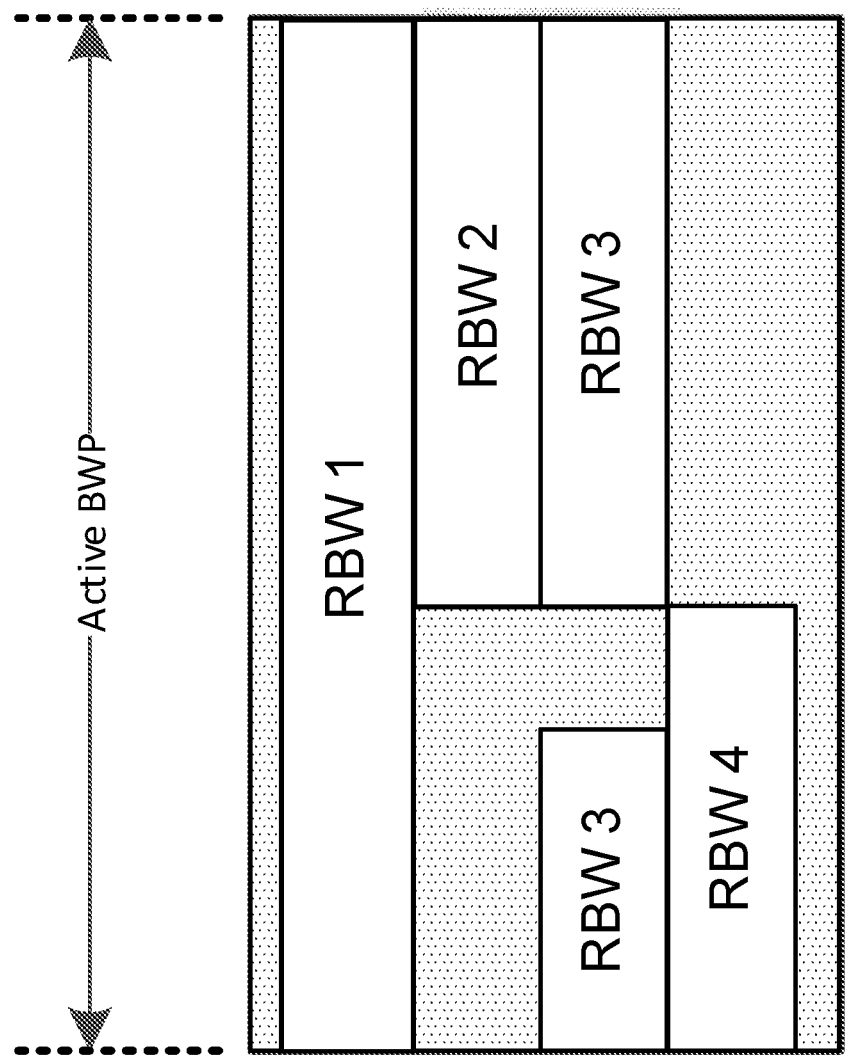
FIG. 5 is a diagram of an example of an Active Bandwidth Part (BWP) illustrating resource bandwidths (RBWs) according to some embodiments of the present disclosure.
Figure 6:
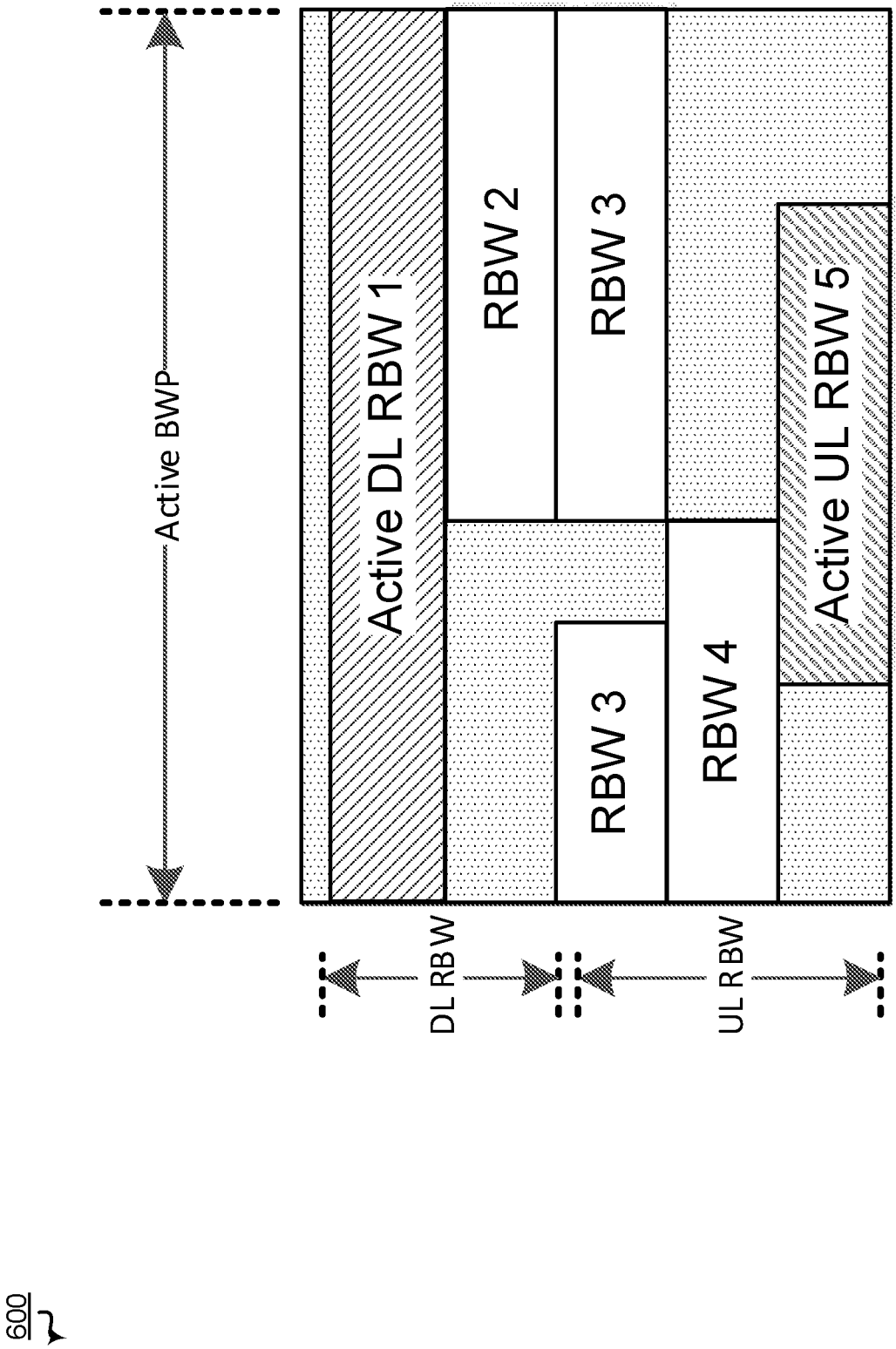
FIG. 6 is a diagram of an example BWP that includes a DL RBW portion and an uplink BWP portion according to some embodiments of the present disclosure.
Figure 7:
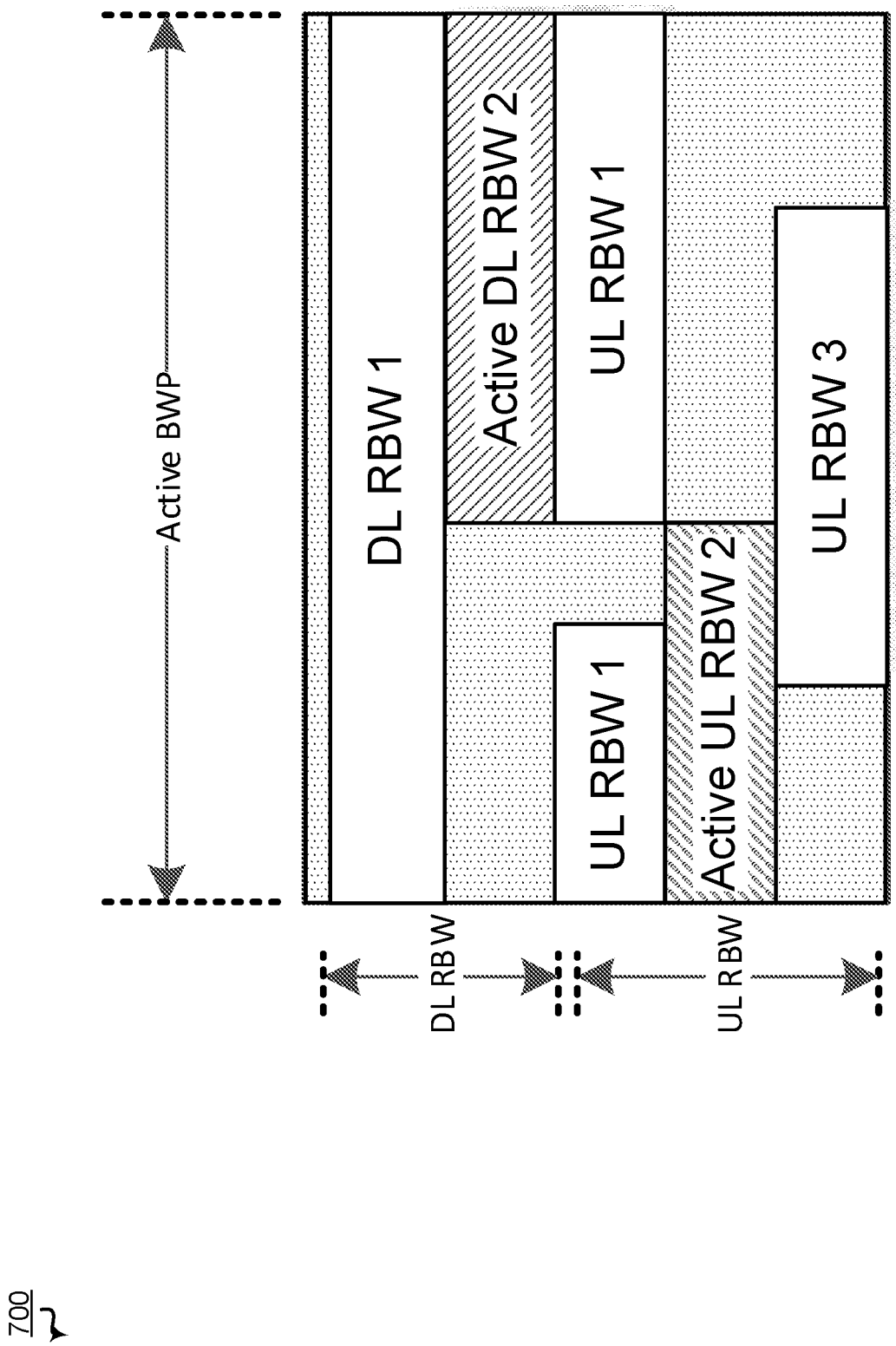
FIG. 7 is a diagram of another example BWP that includes a DL RBW portion and an uplink BWP portion according to some embodiments of the present disclosure.

FIG. 5-7 are diagrams of examples of an Active Bandwidth Part (BWP) illustrating resource bandwidths (RBWs) according to some embodiments of the present disclosure. In FIG. 5, an example BWP layout is illustrated where frequency is the horizontal or x axis and time is the vertical or y axis. In FIG. 5, the BWP has four RBWs. The four RBWs may be allocated for either UL or DL. A base station of the present disclosure may dynamically and flexibly configure the BWP of FIG. 5, as illustrated in FIGS. 6 and 7.

Referring to FIG. 6, an example BWP 600 that includes a DL RBW portion and an uplink BWP portion is illustrated. The DL RBW portion includes two (2) RBWs, and the UL RBW portion includes three (3) RBWs. The first DL RBW1 is the active DL RBW, and the fifth RBW (third UL RBW) is the active UL RBW. In FIG. 6, the RBWs are sequentially numbered.

Referring to FIG. 7, another example BWP 700 that includes a DL RBW portion and an uplink BWP portion is illustrated. The DL RBW portion includes two (2) RBWs, and the UL RBW portion includes three (3) RBWs, similar to FIG. 6. However, in FIG. 7, the UL and DL RBWs are individually numbered, i.e., a first DL RBW1 and a first UL RBW1. Additionally, now the second DL RBW2 is the active DL RBW, and the second UL RBW2 is the active UL RBW.

As described with reference to FIG. 4, a network entity (e.g., a base station) may indicate a change in in the active BWP, e.g., the active RBW thereof, by sending a DCI, sending or RRC message. Alternatively, a UE may determine to change the active BWP, e.g., the active RBW thereof, responsive to determining that the previous active UL RBW (e.g., RBW5/UL RBW3) does not contain RACH configurations.

In addition, the UE may determine to change the active BWP, e.g., the active RBW thereof, responsive to inactivity timer expiration. For example, the UE may determine to switch the active UL RBW from RBW 5/UL RBW3 as in FIG. 6, to UL RBW 2 as in FIG. 7, responsive determining that an inactivity timer associated with the RBW 5/UL RBW3 has expired. To illustrate, if the UE does not use the RBW 5/UL RBW3 for X number of slots, the active RBW is changed. As another example, responsive determining that an inactivity timer associated with the RBW 1/DL RBW1 has expired, the UE switches the active RBW to a default DL RBW. To illustrate, if the UE does not use the RBW1/DL RBW1 for X number of slots, the UE switches the active RBW to a default active DL RBW, such as DL RBW 2.

Alternatively, the UE may determine to switch a portion of a BWP (e.g., DL RBW portion or UL RBW portion) or an entire BWP based on expiration of RBW inactivity timers. To illustrate, the UE may determine to switch to the BWP configuration of FIG. 8 based on either of both of the inactivity timers for the UL and DL RBW. The UE may additionally or alternatively switch a BWP configuration based on expiration of a BWP inactivity timer.

In any of the above examples, switching of the active RBW for one type of RBW (e.g., UL or DL) affects the active RBW of the other type of RBW (e.g., the other of UL OR DL). To illustrate, responsive to determining to switch the active DL RBW to DL RBW2, the UE may determine to switch the UL RBW to a corresponding/associated RBW, such as UL RBW2, based on an association table.

Figure 8:
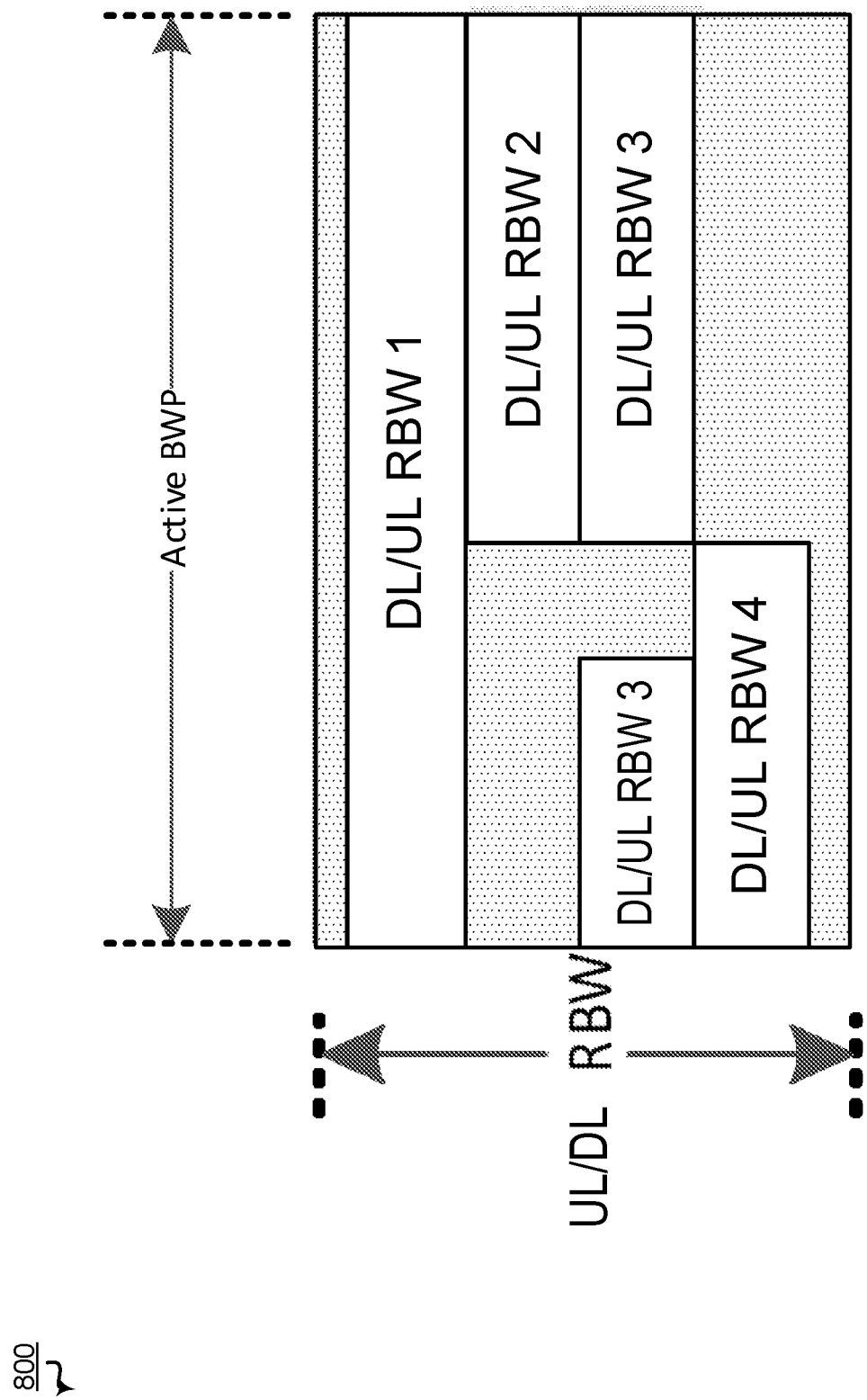
FIG. 8 is a diagram of an example BWP that includes an UL/DL RBW portion according to some embodiments of the present disclosure.

Referring to FIG. 8, an example BWP 800 that includes an UL/DL RBW portion. As compared to FIGS. 6 and 7 which illustrate, separate UL and DL RBWs, the example BWP of FIG. 8 has an UL/DL RBW portion that includes four (4) DL/UL RBWs. The DL/UL RBWs can be configured for downlink or uplink, such as by DCI, timer, RRC, MAC element configuration, etc. In FIG. 7, the RBWs are sequentially numbered, similar to FIG. 6.

Figures 9, 10:
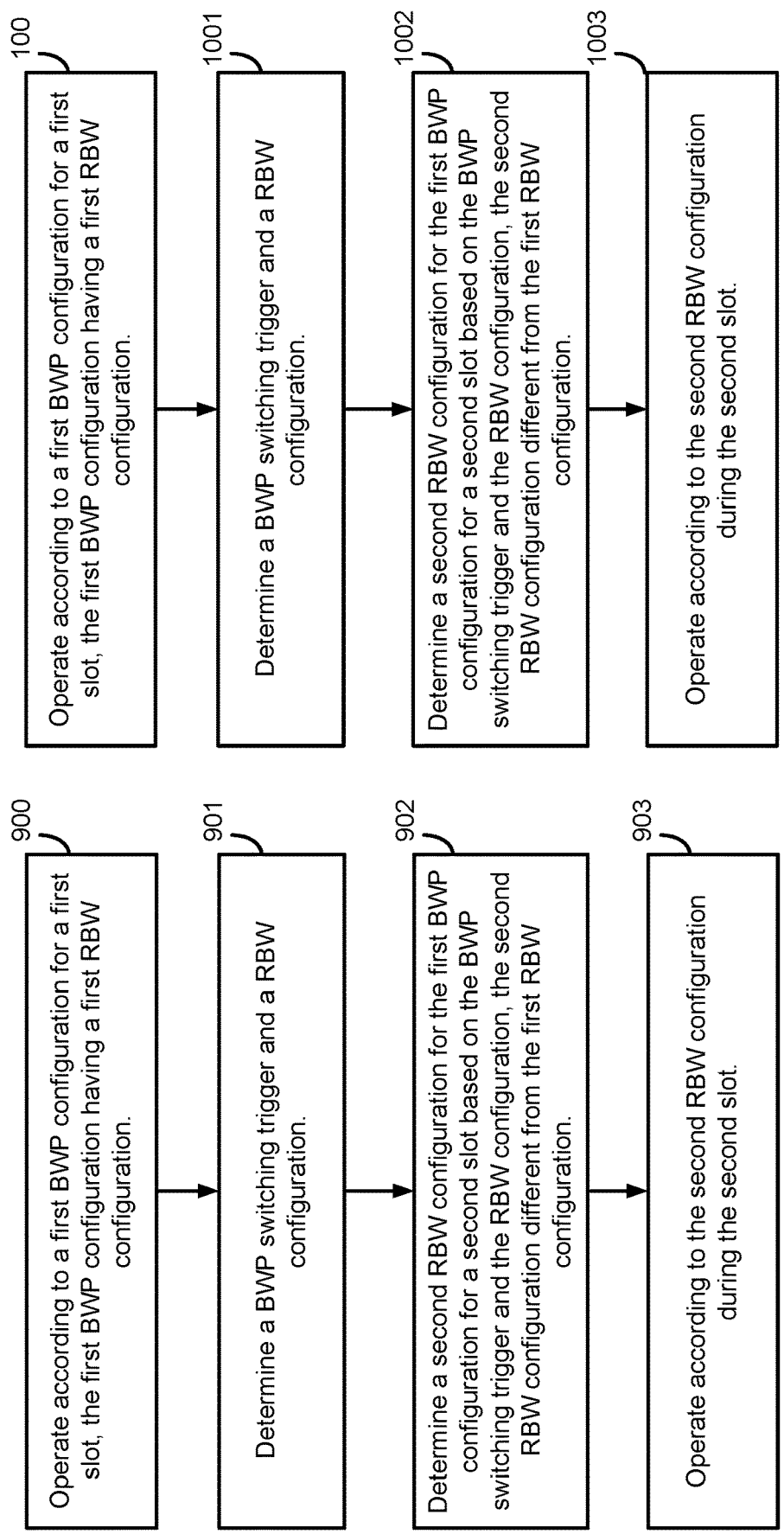
FIG. 9 is a flow diagram illustrating example blocks executed by a UE configured according to some embodiments of the present disclosure.
FIG. 10 is a flow diagram illustrating example blocks executed by a base station configured according to some embodiments of the present disclosure.
Figure 11:
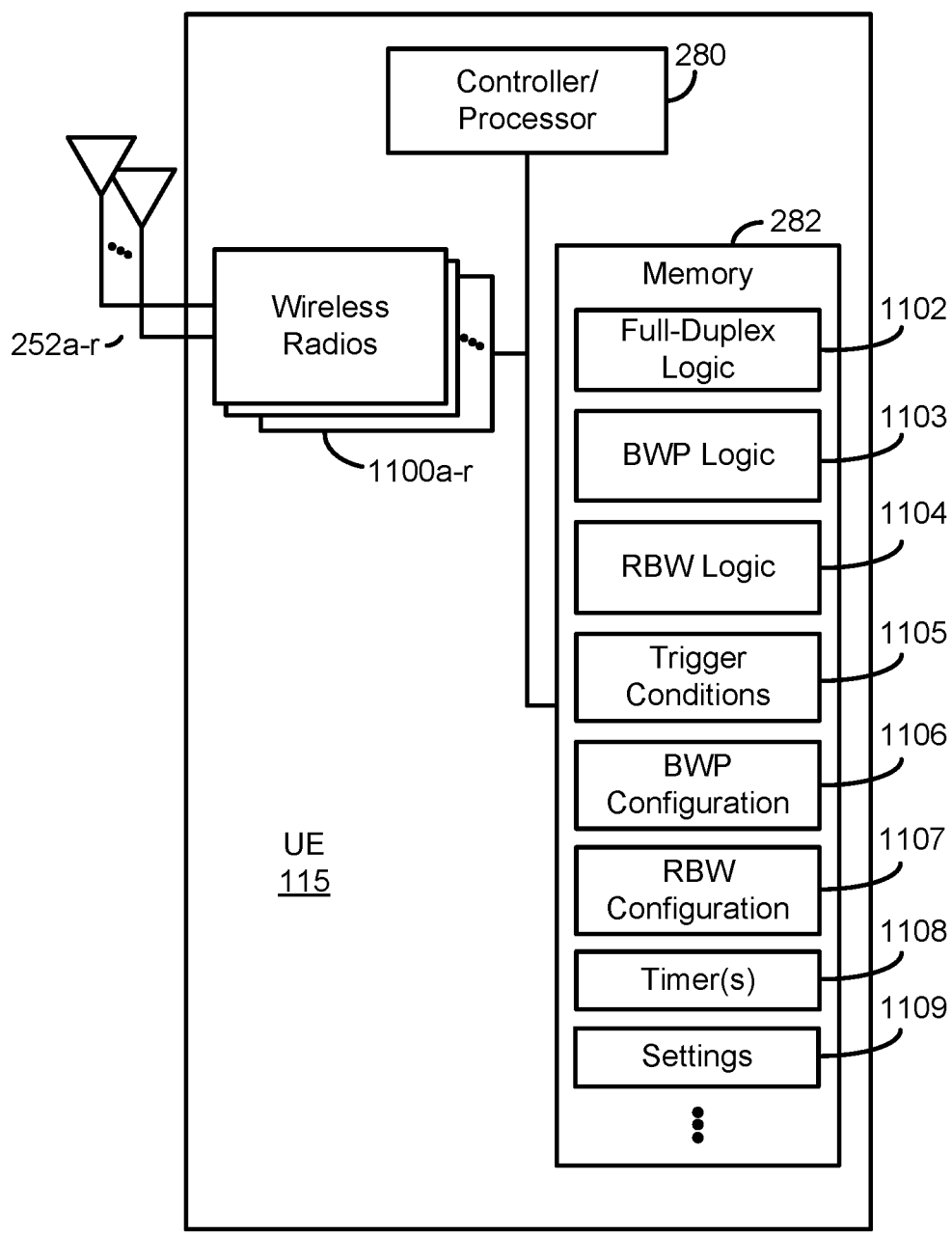
FIG. 11 is a block diagram conceptually illustrating a design of a UE configured to perform precoding information update operations according to some embodiments of the present disclosure.

FIG. 9 is a flow diagram illustrating example blocks executed by a UE configured according to an aspect of the present disclosure. The example blocks will also be described with respect to UE 115 as illustrated in FIG. 11. FIG. 11 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 1100a-r and antennas 252a-r. Wireless radios 1100a-r includes various components and hardware, as illustrated in FIG. 2 for UE 115, including modulator/demodulators 254a-r, MIMO detector 256, receive processor 258, transmit processor 264, and TX MIMO processor 266. As illustrated in the example of FIG. 11, memory 282 stores full-duplex logic 1102, BWP logic 1103, RBW logic 1104, trigger conditions data 1105, BWP configuration data 1106, RBW configuration data 1107, timers 1108, and settings data 1109.

At block 900, a wireless communication device, such as a UE, operates according to a first BWP configuration for a first slot, the first BWP configuration having a first RBW configuration. For example, the UE 115 communicates (e.g., transmits and/or receives data) according to a particular active BWP, as described with reference to FIGS. 4-8.

At block 901, the UE 115 determines a BWP switching trigger and a RBW configuration. For example, the UE 115 determines a to switch an active BWP configuration based on a DCI transmission, an RRC transmission, expiration of an inactivity timer, or based on a MAC element (e.g., RACH procedure configuration condition), as described with reference to FIGS. 4-8. To illustrate, the UE 115 may receive a DCI including an indication for a particular RBW configuration. As another illustration, the UE 115 may evaluate the current BWP configurations and/or timers and determine to a particular RBW configuration for the BWP.

At block 902, the UE 115 determines a second RBW configuration for the first BWP configuration for a second slot based on the BWP switching trigger and the RBW configuration, the second RBW configuration different from the first RBW configuration. For example, the UE 115 determines that the current RBW configuration is different from the indicated RBW configuration and the UE 115 determines to switch RBW configurations, as described with reference to FIGS. 4-8.

In a particular implementation, the UE 115, in addition to or in the alternative of the operations of at block 901 and 902, changes from the first RBW configuration to a second RBW configuration based on a BWP switching trigger and RBW configuration information. The changing may include adjusting or tuning a component of the UE 115 to operate according to the second RBW. For example, an antenna configuration, an antenna component, or a filter may be adjusted or tuned to implement a transmission or reception via the second RBW configuration. Additionally, a second adjustment or tuning may be performed for the other of the transmission or the reception. That is, the UE 115 may adjust the RBWs (e.g., two RBWs) for both the transmission and the reception (e.g., uplink and downlink or sidelink outgoing and incoming).

At block 903, the UE 115 operates according to the second RBW configuration during the second slot. For example, the UE 115 communicates (e.g., transmits and/or receives) data according to second configuration of the particular active BWP, as described with reference to FIGS. 4-8.

The UE 115 may execute additional blocks (or the UE 115 may be configured further perform additional operations) in other implementations. For example, the UE 115 may perform one or more operations described above. As another example, the UE 115 may perform one or more aspects as described below.

In a first aspect, the BWP switching trigger is based on a DCI, an inactivity timer, RRC signaling, or MAC entity switching, and operating according to the second RBW configuration during the second slot includes: transmitting, by the UE, UL data during an active UL RBW; receiving, by the UE, DL data during an active DL RBW; or both.

In a second aspect, alone or in combination with one or more of the above aspects, the first BWP configuration is a joint BWP configuration and is configured for both DL and UL.

In a third aspect, alone or in combination with one or more of the above aspects, the first BWP configuration has one or more DL RBWs and one or more UL RBWs.

In a fourth aspect, alone or in combination with one or more of the above aspects, the first BWP configuration has 4 or more DL RBWs and 4 or more UL RBWs.

In a fifth aspect, alone or in combination with one or more of the above aspects, the UE is operating in SBFD.

In a sixth aspect, alone or in combination with one or more of the above aspects, the first BWP configuration has one or more joint RBWs, the one or more joint RBWs can be configured to be either DL, UL or both.

In a seventh aspect, alone or in combination with one or more of the above aspects, the UE is operating in IBFD.

In an eighth aspect, alone or in combination with one or more of the above aspects, the UE 115 configures a particular joint RBW as downlink based on a RBW configuration table.

In a ninth aspect, alone or in combination with one or more of the above aspects, the one or more DL RBWs and the one or more UL RBWs have unique identification numbers.

In an tenth aspect, alone or in combination with one or more of the above aspects, at least one of the one or more DL RBWs and at least one of the one or more UL RBWs have a same identification number.

In an eleventh aspect, alone or in combination with one or more of the above aspects, the UE 115 receives a DCI transmission indicating an RBW configuration.

In a twelfth aspect, alone or in combination with one or more of the above aspects, the UE 115 determines the BWP change based on an indicator in the DCI.

In a thirteenth aspect, alone or in combination with one or more of the above aspects, the UE 115 determines the BWP and the RBW based on an indicator in the DCI.

In a fourteenth aspect, alone or in combination with one or more of the above aspects, the indicator corresponds to indicator bits in the DCI.

In a fifteenth aspect, alone or in combination with one or more of the above aspects, the UE 115 switches the DL RBW to a second DL RBW based on an indicator in the DCI.

In a sixteenth aspect, alone or in combination with one or more of the above aspects, the UE 115 maintains the UL RBW in response to switching the DL RBW to the second DL RBW.

In a seventeenth aspect, alone or in combination with one or more of the above aspects, maintaining the UL RBW based on the indicator in the DCI.

In an eighteenth aspect, alone or in combination with one or more of the above aspects, the UE 115 switches the UL RBW to a second UL RBW in response to switching the DL RBW to the second DL RBW.

In a nineteenth aspect, alone or in combination with one or more of the above aspects, the UE switches the UL RBW to a second UL RBW based on the indicator in the DCI.

In a twentieth aspect, alone or in combination with one or more of the above aspects, the UE 115 switches the DL BWP to a second DL BWP based on an indicator in the DCI, and determines DL RBWs based on the second DL BWP.

In a twenty-first aspect, alone or in combination with one or more of the above aspects, the UE 115 switches the UL RBW to a second UL RBW based on an indicator in the DCI.

In a twenty-second aspect, alone or in combination with one or more of the above aspects, the UE 115 maintains the DL RBW in response to switching the UL RBW to the second UL RBW.

In a twenty-third aspect, alone or in combination with one or more of the above aspects, the UE 115 maintains the DL RBW based on the indicator in the DCI.

In a twenty-fourth aspect, alone or in combination with one or more of the above aspects, the UE 115 switches the DL RBW to a second DL RBW in response to switching the UL RBW to the second UL RBW.

In a twenty-fifth aspect, alone or in combination with one or more of the above aspects, the UE 115 switches the DL RBW to a second DL RBW based on the indicator in the DCI.

In a twenty-sixth aspect, alone or in combination with one or more of the above aspects, the UE 115 switches the UL BWP to a second UL BWP based on an indicator in the DCI; and determines UL RBWs based on the second UL BWP.

In a twenty-seventh aspect, alone or in combination with one or more of the above aspects, the UE 115 receives an RRC message indicating associations between DL RBWs and UL RBW, the associations indicate corresponding RBW switches for UL and DL.

In a twenty-eighth aspect, alone or in combination with one or more of the above aspects, each RBW of the BWP has a corresponding inactivity timer.

In a twenty-ninth aspect, alone or in combination with one or more of the above aspects, the UE 115 determines that a particular RBW does not have a dedicated inactivity timer, and in response to expiration of another inactivity timer, maintains the current RBW configuration for the particular RBW based on determining that the particular RBW does not have the dedicated inactivity timer.

In a thirtieth aspect, alone or in combination with one or more of the above aspects, the UE 115, in response to expiration of the other inactivity timer, refrains from switching to a default BWP configuration for the particular RBW based on determining that the particular RBW does not have the dedicated inactivity timer.

In a thirty-first aspect, alone or in combination with one or more of the above aspects, the DL RBWs have dedicated inactivity timers, and the UL RBWs do not have dedicated inactivity timers.

In a thirty-second aspect, alone or in combination with one or more of the above aspects, the UE 115, responsive to expiration of an inactivity timer for the BWP, switches the entire BWP to a new joint BWP with both RBWs for DL and UL.

In a thirty-third aspect, alone or in combination with one or more of the above aspects, the UE 115, responsive to expiration of an inactivity timer for the BWP, switches to a separate default DL BWP and a default UL BWP.

In a thirty-fourth aspect, alone or in combination with one or more of the above aspects, the active UL RBW is configured for RACH procedures or contains RACH configurations.

In a thirty-fifth aspect, alone or in combination with one or more of the above aspects, the current BWP is configured for RACH procedures.

In a thirty-sixth aspect, alone or in combination with one or more of the above aspects, the UE 115, determines that the current joint (DL/UL) BWP is not configured for RACH procedures, and responsive to determining that the current joint (DL/UL) BWP is not configured for RACH procedures, the UE 115 switches the joint BWP to a default UL BWP configured for RACH procedures.

In a thirty-seventh aspect, alone or in combination with one or more of the above aspects, the UE 115, responsive to determining that the current joint (DL/UL) BWP is not configured for RACH procedures, maintains the DL configuration of the joint BWP.

In a thirty-eighth aspect, alone or in combination with one or more of the above aspects, the UE 115 determines that the current joint (DL/UL) BWP is not configured for RACH procedures, and responsive to determining that the current joint BWP is not configured for RACH procedures, the UE 115 switches the joint BWP to a default joint BWP with a RBW configured for RACH procedures.

In a thirty-ninth aspect, alone or in combination with one or more of the above aspects, the UE 115 determines that the current joint (DL/UL) BWP is not configured for RACH procedures, and responsive to determining that the current joint (DL/UL) BWP is not configured for RACH procedures, the UE 115 switches the joint BWP to a default UL BWP and to a default DL BWP each of which are configured for RACH procedures.

In a fortieth aspect, alone or in combination with one or more of the above aspects, the UE 115, prior to determining the BWP switching trigger and the RBW configuration, transmits a capabilities message indicating that the wireless communication device is configured for configurable RBW BWPs.

In a forty-first aspect, alone or in combination with one or more of the above aspects, the UE 115, prior to determining the BWP switching trigger and the RBW configuration, receives a configuration message from a second wireless communication device indicating an configurable RBW BWP mode.

In a forty-second aspect, alone or in combination with one or more of the above aspects, the second RBW configuration different from the first RBW configuration corresponds to: a different active UL RBW, a different active DL RBW, a different number of total RBWs, a different number of UL RBWs, a different number of DL RBWs, at least one RBW having a different bandwidth, at least one RBW having a different set of time-frequency resources, or a combination thereof.

In a forty-third aspect, alone or in combination with one or more of the above aspects, the UE 115 is operating in a cross-division duplex (xDD) mode.

In another aspect, a method of wireless communication includes: communicating, by a wireless communication device during a first slot, according to a first resource bandwidth (RBW) configuration of a bandwidth part (BWP) configuration; changing, by the wireless communication device, from the first RBW configuration to a second RBW configuration based on a BWP switching trigger and RBW configuration information; and communicating, by the wireless communication device during a second slot, according to the second RBW configuration, the second RBW configuration different from the first RBW configuration.

In an additional aspect, alone or in combination with one or more of the above aspects, changing from the first RBW configuration to the second RBW configuration includes: adjusting, by the wireless communication device, a component to the second RBW configuration.

In an additional aspect, alone or in combination with one or more of the above aspects, changing from the first RBW configuration to the second RBW configuration includes: tuning, by the wireless communication device, a component to the second RBW configuration, and the component comprises a filter or an antenna component.

In an additional aspect, alone or in combination with one or more of the above aspects, the second RBW configuration is associated with the BWP configuration. For example, the RBW does not involve a change of the current, active BWP.

In an additional aspect, alone or in combination with one or more of the above aspects, the second RBW configuration is associated with a second BWP configuration. For example, the RBW change is based on or associated with a BWP change.

Accordingly, a UE and a base station may perform joint downlink and uplink bandwidth part operations for full-duplex wireless communication modes and may switch between resources of the bandwidth part without incurring a switching delay. By performing joint downlink and uplink bandwidth part operations for full-duplex wireless communication modes, throughput and reliability may be increased.

Figure 12:
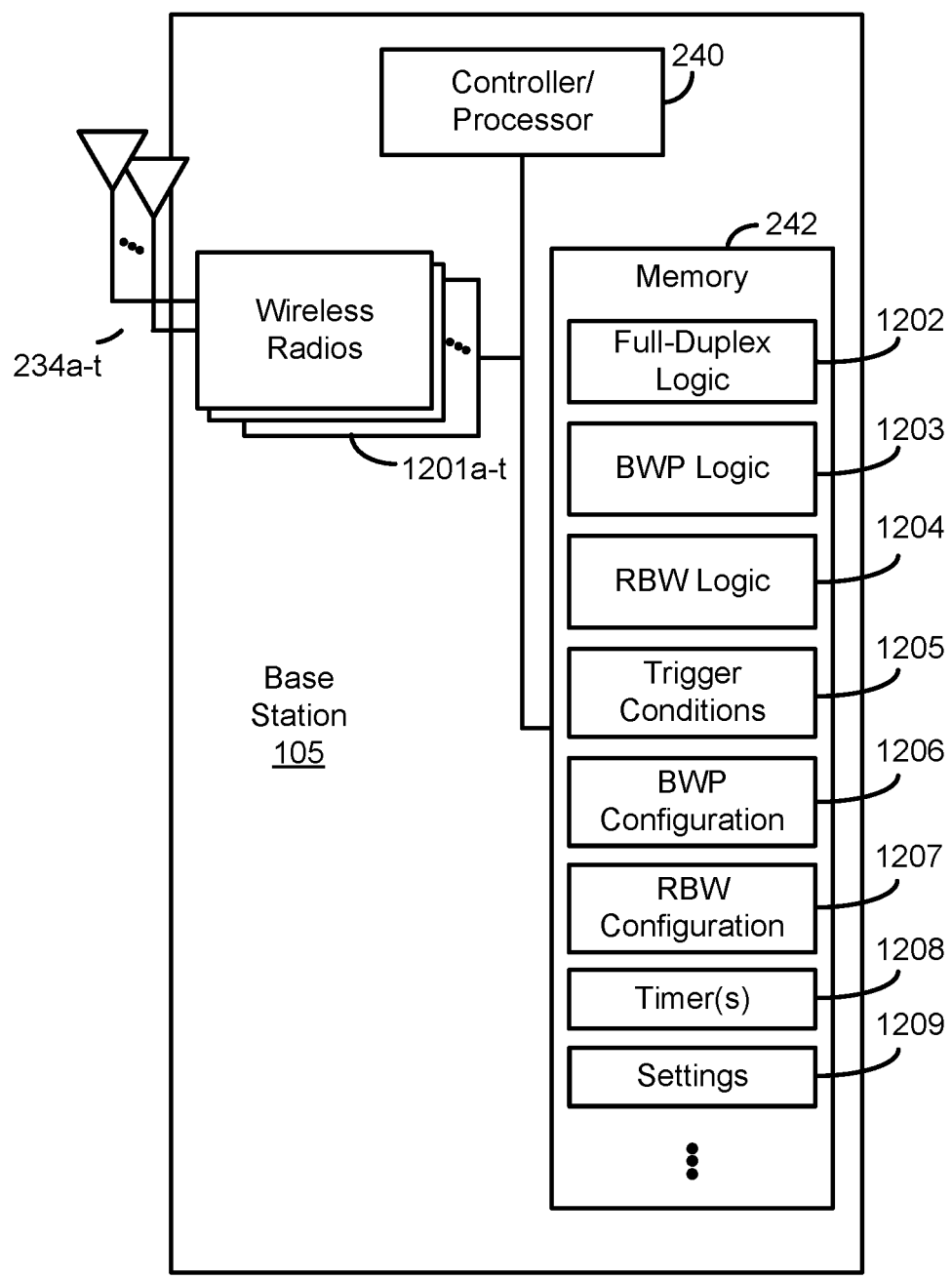
FIG. 12 is a block diagram conceptually illustrating a design of a base station configured to perform precoding information update operations according to some embodiments of the present disclosure.

FIG. 10 is a flow diagram illustrating example blocks executed by wireless communication device configured according to another aspect of the present disclosure. The example blocks will also be described with respect to base station 105 (e.g., gNB) as illustrated in FIG. 12. FIG. 12 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 1201*a-t* and antennas 234*a-t*. Wireless radios 1201*a-t* includes various components and hardware, as illustrated in FIG. 2 for base station 105, including modulator/demodulators 232*a-t*, MIMO detector 236, receive processor 238, transmit processor 220, and TX MIMO processor 230. As illustrated in the example of FIG. 12, memory 242 stores full-duplex logic 1202, BWP logic 1203, RBW logic 1204, trigger conditions data 1205, BWP configuration data 1206, RBW configuration data 1207, timers 1208, and settings data 1209. One of more of 1202-1209 may include or correspond to one of 1102-1109.

At block 1000, a wireless communication device, such as a base station, operates according to a first BWP configuration for a first slot, the first BWP configuration having a first RBW configuration. For example, the base station 105 transmits and/or receives data according to a particular active BWP, as described with reference to FIGS. 4-8.

At block 1001, the base station 105 determines a BWP switching trigger and a RBW configuration. For example, the base station 105 determines a to switch an active BWP configuration based on a DCI transmission, an RRC transmission, expiration of an inactivity timer, or based on a MAC element (e.g., RACH procedure configuration condition), as described with reference to FIGS. 4-8. To illustrate, the base station 105 may transmit a DCI including an indication for a particular RBW configuration. As another illustration, the base station 105 may evaluate the current BWP configurations and/or timers and determine to a particular RBW configuration for the BWP.

At block 1002, the base station 105 determines a second RBW configuration for the first BWP configuration for a second slot based on the BWP switching trigger and the RBW configuration, the second RBW configuration different from the first RBW configuration. For example, the base station 105 determines that the current RBW configuration is different from the indicated RBW configuration and the base station 105 determines to switch RBW configurations, as described with reference to FIGS. 4-8.

At block 1003, the base station 105 operates according to the second RBW configuration during the second slot. For example, the base station 105 transmits and/or receives data according to second configuration of the particular active BWP, as described with reference to FIGS. 4-8.

The base station 105 may execute additional blocks (or the base station 105 may be configured further perform additional operations) in other implementations. For example, the base station 105 may perform one or more operations described above.

In a first aspect, the BWP switching trigger is based on a DCI, an inactivity timer, RRC signaling, or MAC entity switching, and operating according to the second RBW configuration during the second slot includes: receiving, by the UE, UL data during an active UL RBW; transmitting, by the UE, DL data during an active DL RBW; or both.

In a second aspect, alone or in combination with one or more of the above aspects, the first BWP configuration is a joint BWP configuration and is configured for both DL and UL.

In a third aspect, alone or in combination with one or more of the above aspects, the first BWP configuration has one or more DL RBWs and one or more UL RBWs.

In a fourth aspect, alone or in combination with one or more of the above aspects, the first BWP configuration has 4 or more DL RBWs and 4 or more UL RBWs.

In a fifth aspect, alone or in combination with one or more of the above aspects, the base station 105 is operating in SBFD.

In a sixth aspect, alone or in combination with one or more of the above aspects, the first BWP configuration has one or more joint RBWs, the one or more joint RBWs can be configured to be either DL, UL or both.

In a seventh aspect, alone or in combination with one or more of the above aspects, the base station 105 is operating in IBFD.

In an eighth aspect, alone or in combination with one or more of the above aspects, the base station 105 configures a particular joint RBW as downlink based on a RBW configuration table.

In a ninth aspect, alone or in combination with one or more of the above aspects, the one or more DL RBWs and the one or more UL RBWs have unique identification numbers.

In an tenth aspect, alone or in combination with one or more of the above aspects, at least one of the one or more DL RBWs and at least one of the one or more UL RBWs have a same identification number.

In an eleventh aspect, alone or in combination with one or more of the above aspects, the base station 105 transmits a DCI transmission indicating an RBW configuration.

In a twelfth aspect, alone or in combination with one or more of the above aspects, the base station 105 determines the BWP change based on an indicator in the DCI.

In a thirteenth aspect, alone or in combination with one or more of the above aspects, the base station 105 determines the BWP and the RBW based on an indicator in the DCI.

In a fourteenth aspect, alone or in combination with one or more of the above aspects, the indicator corresponds to indicator bits in the DCI.

In a fifteenth aspect, alone or in combination with one or more of the above aspects, the base station 105 switches the DL RBW to a second DL RBW based on an indicator in the DCI.

In a sixteenth aspect, alone or in combination with one or more of the above aspects, the base station 105 maintains the UL RBW in response to switching the DL RBW to the second DL RBW.

In a seventeenth aspect, alone or in combination with one or more of the above aspects, maintaining the UL RBW based on the indicator in the DCI.

In an eighteenth aspect, alone or in combination with one or more of the above aspects, the base station 105 switches the UL RBW to a second UL RBW in response to switching the DL RBW to the second DL RBW.

In a nineteenth aspect, alone or in combination with one or more of the above aspects, the UE switches the UL RBW to a second UL RBW based on the indicator in the DCI.

In a twentieth aspect, alone or in combination with one or more of the above aspects, the base station 105 switches the DL BWP to a second DL BWP based on an indicator in the DCI, and determines DL RBWs based on the second DL BWP.

In a twenty-first aspect, alone or in combination with one or more of the above aspects, the base station 105 switches the UL RBW to a second UL RBW based on an indicator in the DCI.

In a twenty-second aspect, alone or in combination with one or more of the above aspects, the base station 105 maintains the DL RBW in response to switching the UL RBW to the second UL RBW.

In a twenty-third aspect, alone or in combination with one or more of the above aspects, the base station 105 maintains the DL RBW based on the indicator in the DCI.

In a twenty-fourth aspect, alone or in combination with one or more of the above aspects, the base station 105 switches the DL RBW to a second DL RBW in response to switching the UL RBW to the second UL RBW.

In a twenty-fifth aspect, alone or in combination with one or more of the above aspects, the base station 105 switches the DL RBW to a second DL RBW based on the indicator in the DCI.

In a twenty-sixth aspect, alone or in combination with one or more of the above aspects, the base station 105 switches the UL BWP to a second UL BWP based on an indicator in the DCI; and determines UL RBWs based on the second UL BWP.

In a twenty-seventh aspect, alone or in combination with one or more of the above aspects, the base station 105 transmits an RRC message indicating associations between DL RBWs and UL RBW, the associations indicate corresponding RBW switches for UL and DL.

In a twenty-eighth aspect, alone or in combination with one or more of the above aspects, each RBW of the BWP has a corresponding inactivity timer.

In a twenty-ninth aspect, alone or in combination with one or more of the above aspects, the base station 105 determines that a particular RBW does not have a dedicated inactivity timer, and in response to expiration of another inactivity timer, maintains the current RBW configuration for the particular RBW based on determining that the particular RBW does not have the dedicated inactivity timer.

In a thirtieth aspect, alone or in combination with one or more of the above aspects, the base station 105, in response to expiration of the other inactivity timer, refrains from switching to a default BWP configuration for the particular RBW based on determining that the particular RBW does not have the dedicated inactivity timer.

In a thirty-first aspect, alone or in combination with one or more of the above aspects, the DL RBWs have dedicated inactivity timers, and the UL RBWs do not have dedicated inactivity timers.

In a thirty-second aspect, alone or in combination with one or more of the above aspects, the base station 105, responsive to expiration of an inactivity timer for the BWP, switches the entire BWP to a new joint BWP with both RBWs for DL and UL.

In a thirty-third aspect, alone or in combination with one or more of the above aspects, the base station 105, responsive to expiration of an inactivity timer for the BWP, switches to a separate default DL BWP and a default UL BWP.

In a thirty-fourth aspect, alone or in combination with one or more of the above aspects, the active UL RBW is configured for RACH procedures or contains RACH configurations.

In a thirty-fifth aspect, alone or in combination with one or more of the above aspects, the current BWP is configured for RACH procedures.

In a thirty-sixth aspect, alone or in combination with one or more of the above aspects, the base station 105, determines that the current joint (DL/UL) BWP is not configured for RACH procedures, and responsive to determining that the current joint (DL/UL) BWP is not configured for RACH procedures, the base station 105 switches the joint BWP to a default UL BWP configured for RACH procedures.

In a thirty-seventh aspect, alone or in combination with one or more of the above aspects, the base station 105, responsive to determining that the current joint (DL/UL) BWP is not configured for RACH procedures, maintains the DL configuration of the joint BWP.

In a thirty-eighth aspect, alone or in combination with one or more of the above aspects, the base station 105 determines that the current joint (DL/UL) BWP is not configured for RACH procedures, and responsive to determining that the current joint BWP is not configured for RACH procedures, the base station 105 switches the joint BWP to a default joint BWP with a RBW configured for RACH procedures.

In a thirty-ninth aspect, alone or in combination with one or more of the above aspects, the base station 105 determines that the current joint (DL/UL) BWP is not configured for RACH procedures, and responsive to determining that the current joint (DL/UL) BWP is not configured for RACH procedures, the base station 105 switches the joint BWP to a default UL BWP and to a default DL BWP each of which are configured for RACH procedures.

In a fortieth aspect, alone or in combination with one or more of the above aspects, the base station 105, prior to determining the BWP switching trigger and the RBW configuration, receives a capabilities message indicating that the UE is configured for configurable RBW BWPs.

In a forty-first aspect, alone or in combination with one or more of the above aspects, the base station 105, prior to determining the BWP switching trigger and the RBW configuration, transmits a configuration message indicating an configurable RBW BWP mode.

In a forty-second aspect, alone or in combination with one or more of the above aspects, the second RBW configuration different from the first RBW configuration corresponds to: a different active UL RBW, a different active DL RBW, a different number of total RBWs, a different number of UL RBWs, a different number of DL RBWs, at least one RBW having a different bandwidth, at least one RBW having a different set of time-frequency resources, or a combination thereof.

In a forty-third aspect, alone or in combination with one or more of the above aspects, the base station 105 is operating in a cross-division duplex (xDD) mode.

Accordingly, a UE and a base station may perform joint downlink and uplink bandwidth part operations for full-duplex wireless communication modes and may switch between resources of the bandwidth part without incurring a switching delay. By performing joint downlink and uplink bandwidth part operations for full-duplex wireless communication modes, throughput and reliability may be increased.

Figure 13:
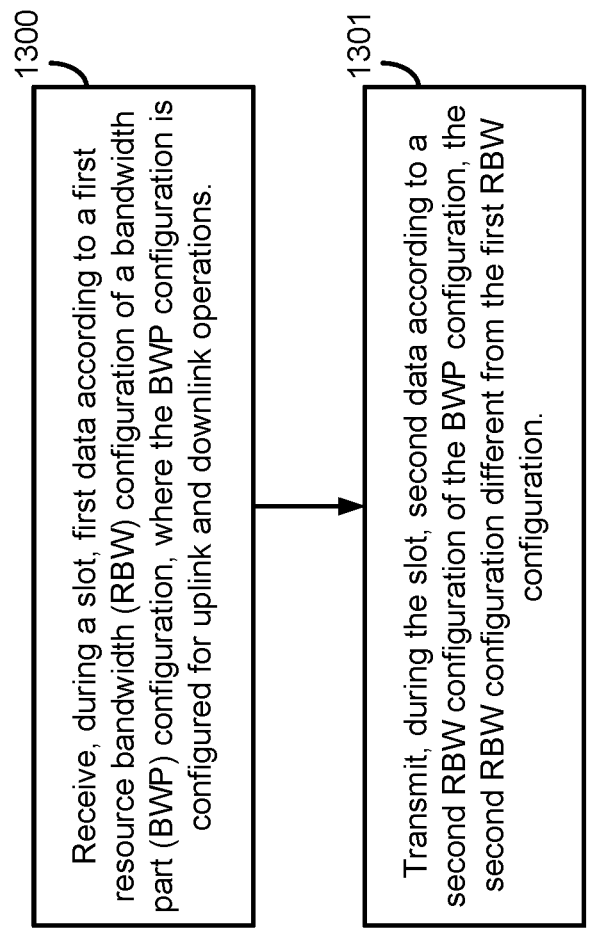
FIG. 13 is a flow diagram illustrating example blocks executed by a wireless communication device configured according to some embodiments of the present disclosure.

FIG. 13 is a flow diagram illustrating example blocks executed by a wireless communication device (e.g., a UE 115 or base station 105) configured according to an aspect of the present disclosure. The example blocks will also be described with respect to UE 115 as illustrated in FIG. 11 and to base station 105 as illustrated in FIG. 12.

At block 1300, a wireless communication device, receives, during a slot, first data according to a first resource bandwidth (RBW) configuration of a bandwidth part (BWP) configuration. The BWP configuration is configured for uplink and downlink operations. For example, the UE 115 or base station 105 receives first data according to a first RBW of a particular active BWP, as described with reference to FIGS. 4-12.

At block 1301, the wireless communication device transmits, during the slot, second data according to a second RBW configuration of the BWP configuration. The second RBW configuration different from the first RBW configuration. For example, the UE 115 or base station 105 transmits second data according to a second RBW of the particular active BWP which is different from the first RBW, as described with reference to FIGS. 4-12. Specifically, such full-duplex operations or simultaneous transmission and reception of blocks 1300 and 1301 may include or correspond to the full-duplex operations as described in blocks 900, 903, 1000, and 1003. To illustrate, the wireless communication device may operate as illustrated in blocks 1300 and 1301 at any of blocks 900, 903, 1000, or 1003 in FIGS. 9. and 10. Additionally, the wireless communication device may switch the RBWs of the BWP or switch the BWP without incurring a switching delay as described in 901 and 902 or 1001 and 1002. After the switch, the wireless communication device may again operate in full-duplex mode as described in 900, 903, 1000, 1003, or 1300 and 1301. Example differences of the RBWs and configurations of RBWs of a BWP are illustrated and described with reference to FIGS. 5-8.

In addition, although the example of FIG. 13 is described with respect to uplink and downlink full-duplex operations, the full-duplex operations may include or be sidelink communications. That is, the uplink transmission may be an outgoing sidelink transmission, the downlink transmission may be an incoming sidelink transmission, or both, in other implementations.

The wireless communication device may execute additional blocks (or the wireless communication device may be configured further perform additional operations) in other implementations. For example, the wireless communication device may perform one or more operations described above, such as in FIGS. 4-12. As another example, the wireless communication device may perform one or more aspects as described below.

In a first aspect, the wireless communication device comprises a user equipment (UE).

In a second aspect, alone or in combination with one or more of the above aspects, the wireless communication device comprises a network device.

In a third aspect, alone or in combination with one or more of the above aspects, the BWP configuration is a joint BWP configuration and is configured for both downlink (DL) and uplink (UL).

In a fourth aspect, alone or in combination with one or more of the above aspects, the BWP configuration has one or more DL RBWs and one or more UL RBWs, and the wireless communication device is operating in sub-band full-duplex (SBFD).

In a fifth aspect, alone or in combination with one or more of the above aspects, the BWP configuration has one or more joint RBWs, the one or more joint RBWs can be configured to be either DL, UL or both, and the wireless communication device is operating in in-band full-duplex (IBFD).

In a sixth aspect, alone or in combination with one or more of the above aspects, further comprising: configuring, by the wireless communication device, a particular joint RBW of the one or more joint RBWs as downlink based on a RBW configuration table.

In a seventh aspect, alone or in combination with one or more of the above aspects, the BWP configuration has one or more downlink (DL) RBWs and one or more uplink (UL) RBWs, and the one or more DL RBWs and the one or more UL RBWs have unique identification numbers.

In an eighth aspect, alone or in combination with one or more of the above aspects, the BWP configuration has one or more downlink (DL) RBWs and one or more uplink (UL) RBWs, and at least one of the one or more DL RBWs and at least one of the one or more UL RBWs have a same identification number.

In a ninth aspect, alone or in combination with one or more of the above aspects, the second RBW configuration different from the first RBW configuration corresponds to: a different active UL RBW, a different active DL RBW, a different number of UL RBWs, a different number of DL RBWs, at least one RBW having a different bandwidth, at least one RBW having a different set of time-frequency resources, or a combination thereof.

In a tenth aspect, alone or in combination with one or more of the above aspects, the wireless communication device is further configured to: adjust a component to a third RBW configuration for the BWP configuration based on a BWP switching trigger and RBW configuration information; and communicate according to the third RBW configuration during a second slot, the third RBW configuration different from the first RBW configuration, the second RBW configuration, or both.

In an eleventh aspect, alone or in combination with one or more of the above aspects, the component includes a filter or an antenna component, and to adjust the component includes to: adjust a physical or software configuration of the component.

In a twelfth aspect, alone or in combination with one or more of the above aspects, further configured to: determine the BWP switching trigger and the RBW configuration information; and determine the third RBW configuration for the second slot based on the BWP switching trigger and the RBW configuration information.

In a thirteenth aspect, alone or in combination with one or more of the above aspects, the BWP switching trigger is based on a Downlink Control Information (DCI) transmission, an inactivity timer, Radio Resource Control (RRC) signaling, or Medium Access Control (MAC) entity switching, and where to communicate according to the third RBW configuration during the second slot includes to: transmit uplink (UL) data during an active UL RBW; receive downlink (DL) data during an active DL RBW; or both.

In a fourteenth aspect, alone or in combination with one or more of the above aspects, the wireless communication device is further configured to: receive a downlink control information (DCI) transmission indicating the RBW configuration information; and determine the BWP switching trigger and the RBW configuration information based on an indicator in the DCI transmission.

In a fifteenth aspect, alone or in combination with one or more of the above aspects, adjusting the component to the third RBW configuration includes to: switch from a DL RBW, associated with the first RBW configuration, to a second DL RBW, associated with the third RBW configuration, based on the indicator in the DCI transmission.

In a sixteenth aspect, alone or in combination with one or more of the above aspects, the wireless communication device is further configured to: maintain a UL RBW, associated with the third RBW configuration, in response to switching from the DL RBW to the second DL RBW or based on the indicator in the DCI transmission.

In a seventeenth aspect, alone or in combination with one or more of the above aspects, further configured to: switch from a UL RBW, associated with the first RBW configuration, to a second UL RBW, associated with the third RBW configuration, based on switching the DL RBW to the second DL RBW.

In an eighteenth second aspect, alone or in combination with one or more of the above aspects, the wireless communication device is further configured to: adjust a component to a third RBW configuration of a second BWP configuration based on a BWP switching trigger and RBW configuration information; and communicate according to the third RBW configuration during a second slot, the third RBW configuration different from the first RBW configuration, the second RBW configuration, or both.

In a nineteenth aspect, alone or in combination with one or more of the above aspects, the wireless communication device is further configured to: receive a downlink control information (DCI) transmission; switch from a DL BWP, associated with the BWP configuration, to a second DL BWP, associated with a second BWP configuration, based on an indicator in the DCI transmission; and determine DL RBWs of the second BWP configuration based on the second DL BWP.

In a twentieth aspect, alone or in combination with one or more of the above aspects, the wireless communication device is further configured to: receive a downlink control information (DCI) transmission; switch from a UL BWP, associated with the BWP configuration, to a second UL BWP, associated with a second BWP configuration, based on an indicator in the DCI transmission; switch from a UL RBW, associated with the BWP configuration, to a second UL RBW, associated with the second BWP configuration, based on the second UL BWP; and maintain a DL RBW, associated with the BWP configuration, in response to switching the UL RBW to the second UL RBW.

In a twenty-first aspect, alone or in combination with one or more of the above aspects, the wireless communication device is further configured to: receive a downlink control information (DCI) transmission; switch from a UL BWP, associated with the BWP configuration, to a second UL BWP, associated with a second BWP configuration, based on an indicator in the DCI transmission; switch from a UL RBW to a second UL RBW based on the second UL BWP; and switch from a DL RBW, associated with the first RBW configuration, to a second DL RBW, associated with the second RBW configuration, in response to switching the UL RBW to the second UL RBW.

In a twenty-second aspect, alone or in combination with one or more of the above aspects, the wireless communication device is further configured to: receive a downlink control information (DCI) transmission; switch from a UL BWP, associated with the first RBW configuration, to a second UL BWP, associated with the first RBW configuration, based on an indicator in the DCI transmission; and determine UL RBWs based on the second UL BWP.

In a twenty-third aspect, alone or in combination with one or more of the above aspects, the wireless communication device is further configured to: receive a Radio Resource Control (RRC) message indicating associations between DL RBWs and UL RBWs, where the associations indicate corresponding RBW switches for UL and DL RBW configurations of the BWP configuration; and determine at least one of the first RBW configuration or the second RBW configuration based on the associations between DL RBWs and UL RBWs.

In a twenty-fourth aspect, alone or in combination with one or more of the above aspects, each RBW of the BWP configuration has a corresponding inactivity timer.

In a twenty-fifth aspect, alone or in combination with one or more of the above aspects, the wireless communication device is further configured to: determine that the second RBW configuration of the BWP configuration does not have a dedicated inactivity timer; and, in response to expiration of an inactivity timer of another RBW of the BWP configuration, maintain configuration settings of the second RBW configuration for communications during a second slot based on determining that the second RBW configuration does not have the dedicated inactivity timer.

In a twenty-sixth aspect, alone or in combination with one or more of the above aspects, the wireless communication device is further configured to: responsive to expiration of an inactivity timer for the BWP configuration, switch from the BWP configuration to a second BWP configuration which is a joint BWP configuration that includes RBWs for both DL and UL.

In a twenty-seventh aspect, alone or in combination with one or more of the above aspects, the wireless communication device is further configured to: responsive to expiration of an inactivity timer for the BWP configuration, switch from the BWP configuration to a separate default DL BWP configuration and a default UL BWP configuration.

In a twenty-eighth aspect, alone or in combination with one or more of the above aspects, the BWP configuration is a joint BWP configuration, and the wireless communication device is further configured to: determine that the joint BWP configuration is not configured for RACH procedures; and, responsive to determining that the joint BWP configuration is not configured for RACH procedures, switch the joint BWP configuration to a default UL BWP configuration configured for RACH procedures.

In a twenty-ninth aspect, alone or in combination with one or more of the above aspects, the BWP configuration is a joint BWP configuration, and the wireless communication device is further configured to: determine that the joint BWP configuration is not configured for RACH procedures; and, responsive to determining that the joint BWP configuration is not configured for RACH procedures, switch the joint BWP configuration to a default joint BWP configuration with a RBW configured for RACH procedures.

In a thirtieth aspect, alone or in combination with one or more of the above aspects, the BWP configuration is a joint BWP configuration, and the wireless communication device is further configured to: determine that the joint BWP configuration is not configured for RACH procedures; and, responsive to determining that the joint BWP configuration is not configured for RACH procedures, switch the joint BWP configuration to a default UL BWP configuration and to a default DL BWP configuration each of which are configured for RACH procedures.

In a thirty-first aspect, alone or in combination with one or more of the above aspects, the wireless communication device is operating in a cross-division duplex (xDD) mode.

Accordingly, a wireless communication device may perform joint downlink and uplink bandwidth part operations for full-duplex wireless communication modes. By performing joint downlink and uplink bandwidth part operations for full-duplex wireless communication modes, throughput and reliability may be increased.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and modules described herein (e.g., the components, functional blocks, and modules in FIG. 2) may comprise processors, electronics devices, hardware devices, electronics components, logical circuits, memories, software codes, firmware codes, etc., or any combination thereof. In addition, features discussed herein relating to joint BWPs and RBW configuration thereof may be implemented via specialized processor circuitry, via executable instructions, and/or combinations thereof.

Those of skill would further appreciate that the various illustrative logical blocks, modules, circuits, and algorithm steps (e.g., the logical blocks in FIGS. 9 and 10) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication comprising:
   receiving, by a wireless communication device during a slot, first data according to a first resource bandwidth (RBW) configuration of a bandwidth part (BWP) configuration, wherein the BWP configuration is configured for uplink and downlink operations;
   transmitting, by the wireless communication device during the slot, second data according to a second RBW configuration of the BWP configuration, the second RBW configuration different from the first RBW configuration, wherein the first data and the second data each correspond to a data channel transmission;
   receiving a downlink control information (DCI) transmission;
   switching from an uplink BWP, associated with the BWP configuration, to a second uplink BWP, associated with a second BWP configuration, based on an indicator in the DCI transmission;
   switching from an uplink RBW to a second uplink RBW based on the second uplink BWP; and
   switching from a downlink RBW, associated with the first RBW configuration, to a second downlink RBW, associated with the second RBW configuration, in response to switching the uplink RBW to the second uplink RBW.

2. The method of claim 1, wherein the wireless communication device comprises a user equipment (UE).

3. The method of claim 1, wherein the second RBW configuration different from the first RBW configuration corresponds to:
   a different active uplink RBW, a different active downlink RBW, a different number of uplink RBWs, a different number of downlink RBWs, at least one RBW having a different bandwidth, at least one RBW having a different set of time-frequency resources, or a combination thereof.

4. The method of claim 1, wherein the BWP configuration is a joint BWP configuration and is configured for both downlink (DL) and uplink (UL).

5. The method of claim 4, wherein the BWP configuration has one or more DL RBWs and one or more UL RBWs, and wherein the wireless communication device is operating in sub-band full-duplex (SBFD).

6. The method of claim 1, wherein the BWP configuration has one or more joint RBWs, wherein the one or more joint RBWs can be configured to be either uplink, downlink, or both, and wherein the wireless communication device is operating in in-band full-duplex (IBFD).

7. The method of claim 6, further comprising:
   configuring, by the wireless communication device, a particular joint RBW of the one or more joint RBWs as downlink based on a RBW configuration table.

8. The method of claim 1, wherein the BWP configuration has one or more downlink (DL) RBWs and one or more uplink (UL) RBWs, and wherein the one or more DL RBWs and the one or more UL RBWs have unique identification numbers.

9. The method of claim 1, wherein the BWP configuration has one or more downlink (DL) RBWs and one or more uplink (UL) RBWs, and wherein at least one of the one or more DL RBWs and at least one of the one or more UL RBWs have a same identification number.

10. An apparatus configured for wireless communication, comprising:
    at least one processor; and
    a memory coupled to the at least one processor,
    wherein the at least one processor is configured to:
       receive, during a slot, first data according to a first resource bandwidth (RBW) configuration of a bandwidth part (BWP) configuration, wherein the BWP configuration is configured for uplink and downlink operations;
       transmit, during the slot, second data according to a second RBW configuration of the BWP configuration, the second RBW configuration different from the first RBW configuration, wherein the first data and the second data each correspond to a data channel transmission;
       receive a downlink control information (DCI) transmission;
       switch from an uplink BWP, associated with the BWP configuration, to a second uplink BWP, associated with a second BWP configuration, based on an indicator in the DCI transmission;
       switch from an uplink RBW to a second uplink RBW based on the second uplink BWP; and
       switch from a downlink RBW, associated with the first RBW configuration, to a second downlink RBW, associated with the second RBW configuration, in response to switching the uplink RBW to the second uplink RBW.

11. The apparatus of claim 10, wherein the second RBW configuration different from the first RBW configuration corresponds to:
    a different active uplink RBW, a different active downlink RBW, a different number of uplink RBWs, a different number of downlink RBWs, at least one RBW having a different bandwidth, at least one RBW having a different set of time-frequency resources, or a combination thereof.

12. The apparatus of claim 10, wherein the at least one processor is further configured to:
adjust a component to a third RBW configuration for the BWP configuration based on a BWP switching trigger and RBW configuration information; and
communicate according to the third RBW configuration during a second slot, the third RBW configuration different from the first RBW configuration, the second RBW configuration, or both.

13. The apparatus of claim 12, wherein the component includes a filter or an antenna component, and wherein to adjust the component includes to:
adjust a physical or software configuration of the component.

14. The apparatus of claim 13, wherein the at least one processor is further configured to:
determine the BWP switching trigger and the RBW configuration information; and
determine the third RBW configuration for the second slot based on the BWP switching trigger and the RBW configuration information.

15. The apparatus of claim 10, wherein the at least one processor is further configured to:
adjust a component to a third RBW configuration of a second BWP configuration based on a BWP switching trigger and RBW configuration information; and
communicate according to the third RBW configuration during a second slot, the third RBW configuration different from the first RBW configuration, the second RBW configuration, or both.

16. The apparatus of claim 10, wherein the first RBW configuration, the second RBW configuration, or both have a first bandwidth that is smaller than a second bandwidth of the BWP configuration.

17. A non-transitory, computer-readable medium storing instructions that, when executed by a processor, cause the processor to perform operations comprising:
receiving, during a slot, first data according to a first resource bandwidth (RBW) configuration of a bandwidth part (BWP) configuration, wherein the BWP configuration is configured for uplink and downlink operations;
transmitting, during the slot, second data according to a second RBW configuration of the BWP configuration, the second RBW configuration different from the first RBW configuration, wherein the first data and the second data each correspond to a data channel transmission;
receiving a downlink control information (DCI) transmission;
switching from an uplink BWP, associated with the BWP configuration, to a second uplink BWP, associated with a second BWP configuration, based on an indicator in the DCI transmission;
switching from an uplink RBW to a second uplink RBW based on the second uplink BWP; and
switching from a downlink RBW, associated with the first RBW configuration, to a second downlink RBW, associated with the second RBW configuration, in response to switching the uplink RBW to the second uplink RBW.

18. The non-transitory, computer-readable medium of claim 17, wherein the instructions when executed by the processor further cause the processor to perform operations comprising:
receiving a downlink control information (DCI) transmission;
switching from a UL BWP, associated with the first RBW configuration, to a second UL BWP, associated with the first RBW configuration, based on an indicator in the DCI transmission; and
determining UL RBWs based on the second UL BWP.

* * * * *